US010924923B2

(12) United States Patent
Park et al.

(10) Patent No.: US 10,924,923 B2
(45) Date of Patent: Feb. 16, 2021

(54) METHOD AND APPARATUS FOR MANAGING A PROFILE OF A TERMINAL IN A WIRELESS COMMUNICATION SYSTEM

(71) Applicant: Samsung Electronics Co., Ltd., Suwon-si (KR)

(72) Inventors: Jonghan Park, Bucheon-si (KR); Duckey Lee, Seoul (KR); Sangsoo Lee, Suwon-si (KR); Taesun Yeom, Seoul (KR); Hyewon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/402,804

(22) Filed: May 3, 2019

(65) Prior Publication Data

US 2019/0268765 A1 Aug. 29, 2019

Related U.S. Application Data

(63) Continuation of application No. 15/096,850, filed on Apr. 12, 2016, now Pat. No. 10,285,050.

(30) Foreign Application Priority Data

Nov. 27, 2015 (KR) .................. 10-2015-0167081
Mar. 8, 2016 (KR) .................. 10-2016-0027870

(51) Int. Cl.
*H04W 12/04* (2009.01)
*H04L 29/08* (2006.01)
(Continued)

(52) U.S. Cl.
CPC .......... *H04W 12/04* (2013.01); *H04L 9/3247* (2013.01); *H04L 9/3263* (2013.01);
(Continued)

(58) Field of Classification Search
CPC ..... H04W 12/04; H04W 12/10; H04W 8/205; H04W 8/245; H04W 8/183; H04L 67/26; H04L 67/303; H04L 63/126; H04L 9/3247
(Continued)

(56) References Cited

U.S. PATENT DOCUMENTS 9,009,475 B2  4/2015  Hauck et al.
9,462,457 B2* 10/2016  Gao ...................... H04W 12/06
(Continued)

FOREIGN PATENT DOCUMENTS

CN  103503036 A  1/2014
CN  103546886 A  1/2014
(Continued)

OTHER PUBLICATIONS

NPL Search Terms (Year: 2020).*
(Continued)

*Primary Examiner* — Syed A Zaidi
(74) *Attorney, Agent, or Firm* — Jefferson IP Law, LLP

(57) ABSTRACT

A method for downloading a profile of an electronic apparatus is provided. The method includes receiving profile information from a profile information transfer server, transmitting a profile request to an identified profile providing server based on the profile information, and receiving a profile installable in a universal integrated circuit card (UICC) of the electronic apparatus from the profile providing server, and an electronic apparatus. Further, the present disclosure may provide a profile information providing server providing the profile information to the electronic apparatus and an operation thereof, and a profile providing server providing a profile to the electronic apparatus and an operation thereof. Further, the present disclosure may provide a method for swapping a profile between apparatuses,
(Continued)

a method for acquiring profile information using code information, a method for modifying a profile providing server, and an apparatus performing the same.

13 Claims, 17 Drawing Sheets

Related U.S. Application Data

(60) Provisional application No. 62/146,622, filed on Apr. 13, 2015, provisional application No. 62/149,732, filed on Apr. 20, 2015.

(51) Int. Cl.
| | |
|---|---|
| *H04W 12/00* | (2021.01) |
| *H04W 8/24* | (2009.01) |
| *H04W 8/20* | (2009.01) |
| *H04L 29/06* | (2006.01) |
| *H04W 12/10* | (2021.01) |
| *H04L 9/32* | (2006.01) |
| *H04W 8/18* | (2009.01) |

(52) U.S. Cl.
CPC .......... *H04L 9/3273* (2013.01); *H04L 63/126* (2013.01); *H04L 67/26* (2013.01); *H04L 67/303* (2013.01); *H04W 8/205* (2013.01); *H04W 8/245* (2013.01); *H04W 12/0023* (2019.01); *H04W 12/10* (2013.01); *H04L 2209/80* (2013.01); *H04W 8/183* (2013.01)

(58) Field of Classification Search
USPC ........................................................ 713/168
See application file for complete search history.

(56) References Cited

U.S. PATENT DOCUMENTS

| | | | | |
|---|---|---|---|---|
| 9,760,726 | B2* | 9/2017 | Berard | .................. H04W 12/04 |
| 10,242,210 | B2 | 3/2019 | Girard et al. | |
| 2003/0101246 | A1 | 5/2003 | Lahti | |
| 2011/0306318 | A1 | 12/2011 | Rodgers et al. | |
| 2013/0329683 | A1 | 12/2013 | Berard et al. | |
| 2014/0206313 | A1 | 7/2014 | Spanel et al. | |
| 2014/0219447 | A1 | 8/2014 | Park et al. | |
| 2014/0235210 | A1 | 8/2014 | Park et al. | |
| 2014/0308991 | A1 | 10/2014 | Lee et al. | |
| 2014/0329502 | A1 | 11/2014 | Lee et al. | |
| 2014/0357229 | A1 | 12/2014 | Lee et al. | |
| 2015/0349825 | A1 | 12/2015 | Lee et al. | |
| 2016/0057725 | A1 | 2/2016 | Suh | |
| 2016/0127132 | A1 | 5/2016 | Lee et al. | |
| 2016/0212617 | A1 | 7/2016 | Koshimizu et al. | |
| 2016/0234020 | A1* | 8/2016 | Nix | .................. H04J 11/00 |
| 2016/0249203 | A1* | 8/2016 | Mazali | .................. H04W 12/04 |
| 2016/0373920 | A1 | 12/2016 | Petersson et al. | |
| 2017/0134444 | A1* | 5/2017 | Buckley | .................. H04W 4/10 |
| 2017/0373845 | A1* | 12/2017 | Nix | .................. H04L 9/3249 |

FOREIGN PATENT DOCUMENTS

| | | |
|---|---|---|
| EP | 2747466 A1 | 6/2014 |
| JP | 2005-510802 A | 4/2005 |
| JP | 2013-535142 A | 9/2013 |
| WO | 2014/092385 A1 | 6/2014 |
| WO | 2014/171707 A1 | 10/2014 |
| WO | 2014/193181 A1 | 12/2014 |
| WO | 2014/193188 A1 | 12/2014 |

OTHER PUBLICATIONS

NPL Search Results (Year: 2020).*
3GPP; TSG SA; "Subscription management '3GPP; TSG SA; Subscription management (SuM) requirements", 3rd Generation Partnership Project; (Release 12), 3GPP TS 32.140 V12.0.0, Oct. 2, 2014, http://www.3gpp.org/DynaReport/32140.htm, see sections 4.4.1, 4.4.2.
Japanese Office Action dated Nov. 25, 2019, issued in Japanese Application No. 2017-553095.
Chinese Office Action dated Mar. 30, 2020, issued in Chinese Application No. 201680021689.3.
European Office Action dated Apr. 1, 2020, issued in European Application No. 19179786.9.

* cited by examiner

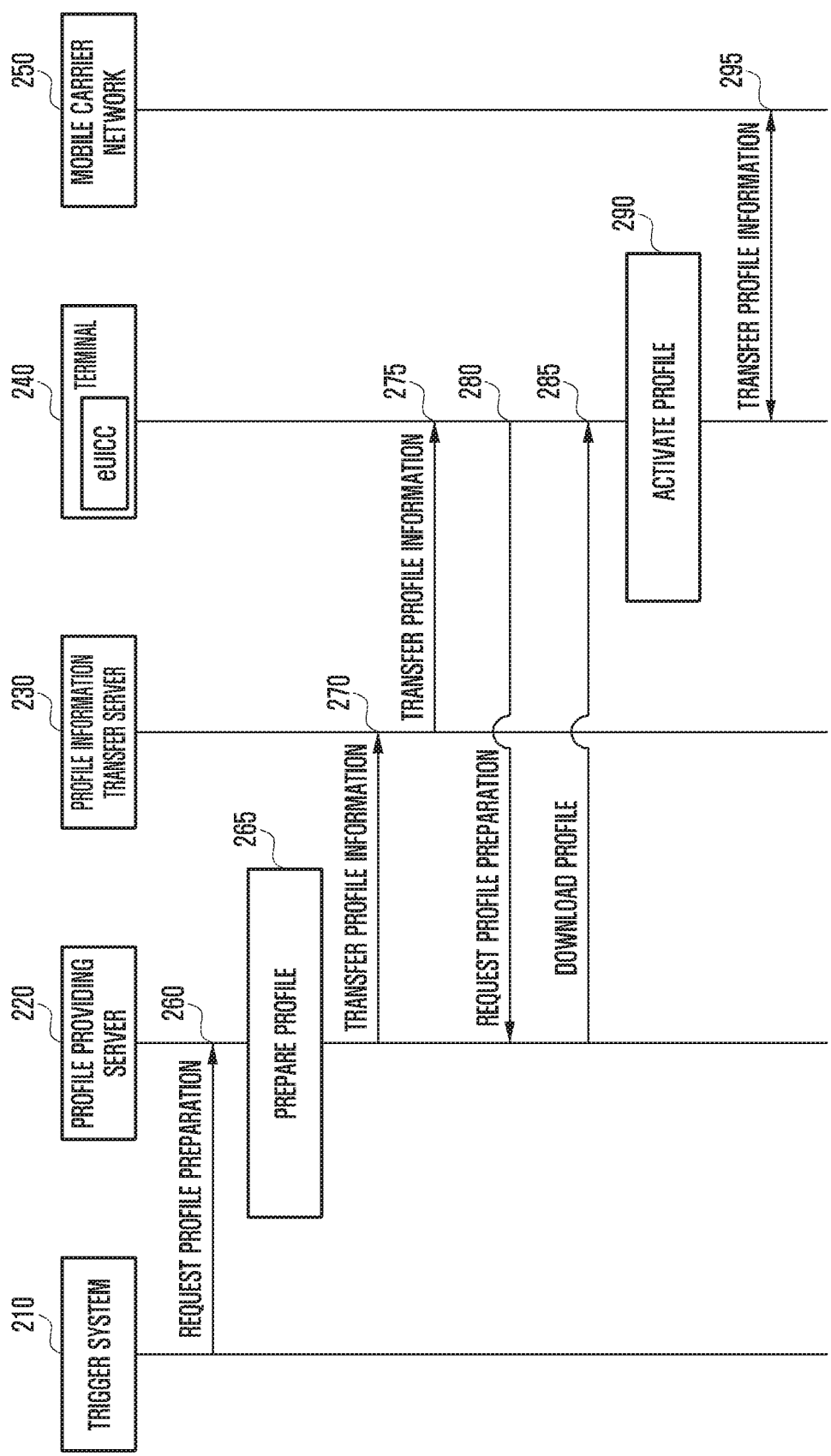

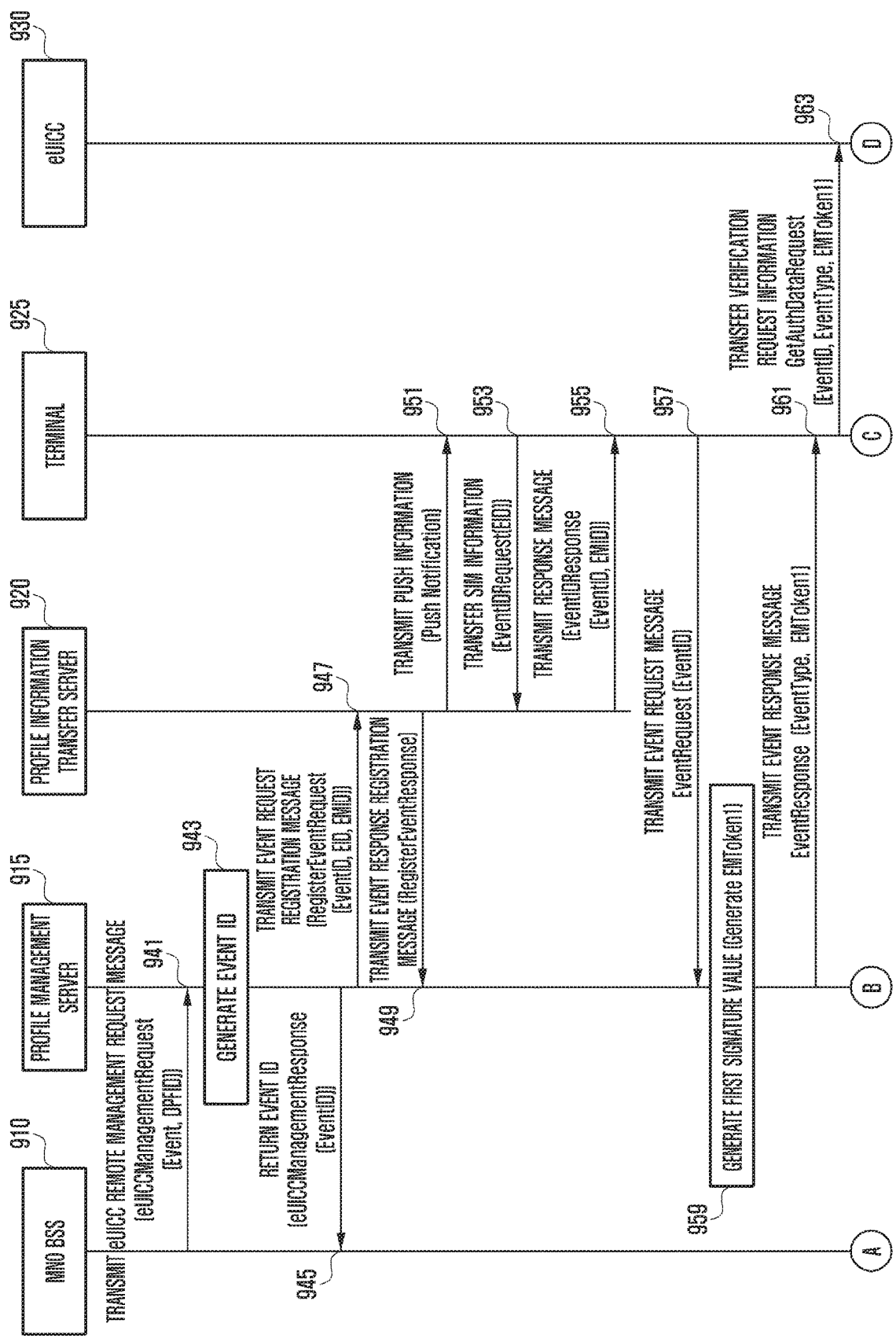

METHOD AND APPARATUS FOR MANAGING A PROFILE OF A TERMINAL IN A WIRELESS COMMUNICATION SYSTEM

CROSS-REFERENCE TO RELATED APPLICATION(S)

This application is a continuation application of prior application Ser. No. 15/096,850, filed on Apr. 12, 2016, which has issued as U.S. Pat. No. 10,285,050 on May 7, 2019 and was based on and claimed priority under 35 U.S.C § 119(e) of a U.S. Provisional application filed on Apr. 13, 2015 in the U.S. Patent and Trademark Office and assigned Ser. No. 62/146,622, and of a U.S. Provisional application filed on Apr. 20, 2015 in the U.S. Patent and Trademark Office and assigned Ser. No. 62/149,732, and claims the benefit under 35 U.S.C. § 119(a) of a Korean patent application filed on Nov. 27, 2015 in the Korean Intellectual Property Office and assigned Serial number 10-2015-0167081, and of a Korean patent application filed on Mar. 8, 2016 in the Korean Intellectual Property Office and assigned Serial number 10-2016-0027870, the entire disclosure of each of which is hereby incorporated by reference.

TECHNICAL FIELD

The present disclosure relates to a method and an apparatus for downloading and installing a communication service to and in a terminal in a communication system for a communication connection. More particularly, the present disclosure relates to a method and an apparatus for downloading and installing a profile in real time in a communication system.

BACKGROUND

A universal integrated circuit card (UICC) is a smart card inserted into a mobile communication terminal, or the like, and is called a UICC card. The UICC may include an access control module for accessing a network of a mobile carrier. An example of the access control module may include a universal subscriber identity module (USIM), a SIM, an internet protocol (IP) multimedia service identity module (ISIM), or the like. The UICC including the USIM is generally called a USIM card. Similarly, the UICC including an SIM module is generally called an SIM card. In the following description of the present disclosure, the SIM card is used as a general term including the UICC, or the like, in which the UICC card, the USIM card, and the ISIM are included. That is, the technology of the SIM card may be identically applied to the USIM card, the ISIM card, or even the general UICC card.

The SIM card may store personal information on a mobile communication subscriber and perform subscriber authentication and a generation of a traffic security key upon an access to a mobile communication network, thereby implementing the use of the safe mobile communication.

The SIM card is generally manufactured as a dedicated card for the corresponding mobile carrier by a request of a specific mobile carrier upon manufacturing. A card is thereby released in which authentication information for accessing a network, for example, USIM application and international mobile subscriber identity (IMSI), a K value, an open platform communication (OPc) value, or the like, is mounted in advance. Therefore, the corresponding mobile carrier receives the manufactured SIM card and delivers the SIM card to a subscriber. Thereafter, if necessary, the SIM card may use technologies of over the air (OTA), or the like, to perform managements of installation, modification, deletion, or the like, of applications within the UICC. A subscriber inserts the UICC card into his/her own mobile communication terminal to use a network of the corresponding mobile carrier and application services. In addition, when replacing a terminal, a subscriber takes out the UICC card from the existing terminal and inserts the UICC card into a new terminal, such that the new terminal may use authentication information, a mobile communication telephone number, a personal telephone directory, or the like, which are stored in the UICC.

However, the SIM card is inconvenient for a mobile communication terminal user in receiving services of other mobile carriers. There is inconvenience in that the mobile communication terminal user needs to physically get the SIM card to receive services from a mobile carrier. For example, there is also inconvenience in that when a mobile communication terminal user travels to other countries, he/she needs to get an on-site SIM card to receive on-site mobile communication services. A roaming service may somewhat solve the foregoing inconveniences, but there is a problem in that the mobile communication terminal user may not receive the roaming services due to an expensive fee and when a contract between mobile carriers are not established.

A significant portion of the foregoing inconveniences may be solved by downloading and installing the SIM module to and in the UICC card. That is, the SIM module of the mobile communication service to be used may be downloaded to the UICC card at the user's desired time. The UICC card may also download and install a plurality of SIM modules and may select and use only one of the plurality of SIM modules. The UICC card may be fixed in a terminal or may not be fixed in the terminal. In particular, the UICC fixed in the terminal is called an embedded UICC (eUICC). Generally, the eUICC fixed in the terminal describes the UICC card which may download and select SIM modules remotely. According to the present disclosure, the UICC card which may download and select the SIM module remotely is commonly called the eUICC. The UICC fixed in the terminal or not fixed in the terminal among the UICC cards which may download and select the SIM modules remotely is commonly called the eUICC. Further, information on the downloaded SIM module is commonly used as the term eUICC profile.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are provided to address at least the above-mentioned problems and/or disadvantages, and to provide at least the advantages described below. Accordingly, an aspect of the present disclosure is to provide a method and an apparatus for a communication connection by allowing a terminal to select a communication service in a communication system.

Another aspect of the present disclosure is to provide a method and an apparatus for downloading a profile in real time to allow a terminal to perform a communication connection in a communication system.

Another aspect of the present disclosure is to provide an apparatus and a method for providing a profile to a terminal in a communication system.

A terminal in a wireless communication system according to an embodiment of the present disclosure includes a receiver (called transceiver or communicator) for receiving profile information from a profile information transfer server and for receiving a profile from a profile providing server using the profile information and a controller for receiving the profile to be connected to a communication service.

A profile information transfer server in a wireless communication system according to an embodiment of the present disclosure includes a transmitter and receiver (called transceiver or communicator) for receiving profile information from a profile providing server and for transferring the profile information to a terminal and a storage for storing the profile information (temporarily storing profile information).

A profile providing server in a wireless communication system according to an embodiment of the present disclosure includes a controller for generating and encrypting a profile and a transmitter (called transceiver or communicator) for transmitting profile information to a profile information transfer server and for transferring the encrypted profile to a terminal using an embedded universal integrated circuit card (eUICC).

A method for downloading a profile of a terminal in a wireless communication system according to an embodiment of the present disclosure includes receiving profile information from a profile information transfer server, receiving a profile from a profile providing server using the profile information, and receiving the profile to be connected to a communication service.

A method for transferring profile information of a profile information transfer server in a wireless communication system according to an embodiment of the present disclosure includes receiving the profile information from a profile providing server and transferring the profile information to a terminal.

A method for providing a profile of a profile providing server in a wireless communication system according to an embodiment of the present disclosure includes generating and encrypting a profile and transferring the encrypted and generated profile to a terminal using an eUICC.

In accordance with an aspect of the present disclosure, a method for downloading a profile of an electronic apparatus is provided. The method includes receiving profile information from a profile information transfer server, transmitting a profile request to an identified profile providing server based on the profile information, and receiving a profile installable in a UICC of the electronic apparatus from the profile providing server.

In accordance with another aspect of the present disclosure, an electronic apparatus for downloading a profile is provided. The electronic apparatus includes a communicator for transmitting and receiving a signal, a UICC for downloading and installing the profile, and a controller for performing a control to receive profile information from a profile information transfer server, transmit a profile request to an identified profile providing server based on the profile information, and receive a profile installable in the UICC of the electronic apparatus from the profile providing server.

In accordance with another aspect of the present disclosure, a method for providing profile information of a profile information transfer server is provided. The method includes receiving profile information from a profile providing server, registering the profile information, and transferring the profile information to an electronic apparatus corresponding to the profile information, in which the profile information is used to allow the electronic apparatus to download a profile installable in a UICC of the electronic apparatus from the profile providing server.

In accordance with another aspect of the present disclosure, a profile information transfer server is provided. The provision information transfer server includes a transceiver for transmitting and receiving a signal and a controller for performing a control to receive profile information from a profile providing server, register the profile information, and transfer the profile information to an electronic apparatus corresponding to the profile information, in which the profile information is used to allow the electronic apparatus to download a profile installable in a UICC of the electronic apparatus from the profile providing server.

In accordance with another aspect of the present disclosure, a method for providing a profile of a profile providing server is provided. The method includes receiving a profile preparation request from a trigger system, transmitting profile information to a profile information transfer server, based on the profile preparation request, receiving a profile download request from an electric apparatus, and transmitting a profile installable in a UICC of the electronic apparatus to the electronic apparatus, in which the profile information is used for the profile download request of the electronic apparatus.

In accordance with another aspect of the present disclosure, a profile providing server is provided. The profile providing server includes a transceiver for transmitting and receiving a signal and a controller for performing a control to receive a profile preparation request from a trigger system, transmit profile information to a profile information transfer server, based on the profile preparation request, receive a profile download request from an electric apparatus, and transmit a profile installable in a UICC of the electronic apparatus to the electronic apparatus, wherein the profile information is used for the profile download request of the electronic apparatus.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a diagram illustrating a mobile communication connection method of a terminal using a UICC which may download and install a profile according to an embodiment of the present disclosure;

FIGS. 9A and 9B are diagrams illustrating a method for changing information on a profile information providing server according to an embodiment of the present disclosure;

Throughout the drawings, like reference numerals will be understood to refer to like parts, components, and structures.

DETAILED DESCRIPTION

Figure 1:
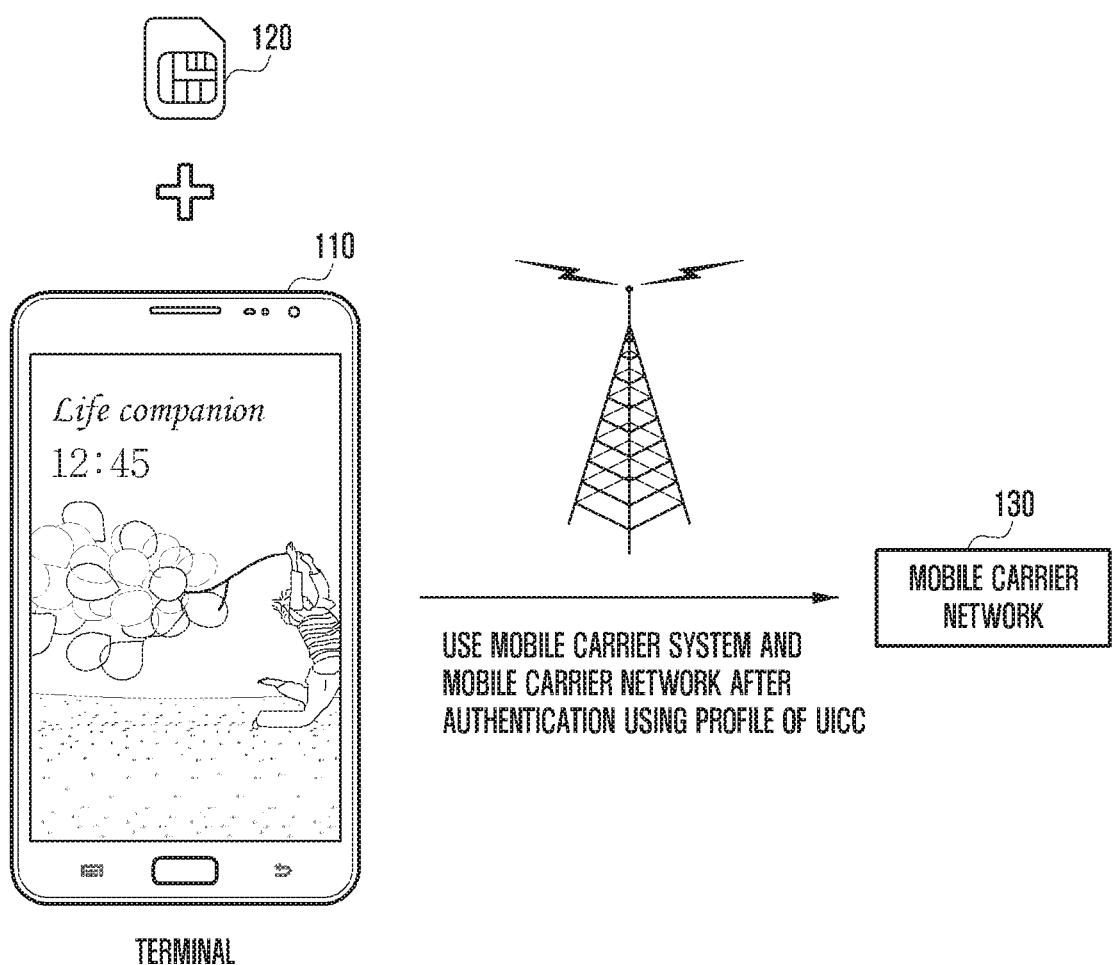
FIG. 1 is a diagram illustrating a mobile communication connection method of a terminal using a universal integrated circuit card (UICC) in which a profile is installed according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

In the present specification, a universal integrated circuit card (UICC) is a smart card inserted into a mobile communication terminal and describes a chip storing personal information such as network access authentication information on a mobile communication subscriber, a telephone directory, and short message service (SMS) to perform subscriber authentication and a generation of a traffic security key upon an access to mobile communication networks such as global system for mobile communications (GSM), wideband code division multiple access (WCDMA), and long term evolution (LTE), thereby implementing the use of the safe mobile communication. The UICC includes communication applications such as a subscriber identification module (SIM), a universal SIM (USIM), and an internet protocol (IP) multimedia SIM (ISIM) according to a kind of mobile communication networks to which a subscriber is accessed. Further, the UICC may provide a high-level security function for including various applications such as an electronic wallet, ticketing, and an electronic passport.

In the present specification, an embedded UICC (eUICC) is not a detachable security module which may be inserted into and separated from a terminal, but a chip-type security module which may be embedded in a terminal. The eUICC may use an over the air (OTA) technology to download and install a profile. The eUICC may be called the UICC which may download and install a profile.

In the present specification, a method for downloading and installing a profile to and in a eUICC using the OTA technology may also be applied to a detachable UICC which may be inserted into and separated from the terminal. That is, the embodiment of the present disclosure may be applied to the UICC which may download and install the profile using the OTA technology.

In the present specification, the term UICC interchanged with the term SIM may be used, and the term eUICC interchanged with the term eSIM may be used.

In the present specification, a profile may describe an application, a file system, an authentication key value, or the like, which are stored in the UICC and are packaged in a software form.

In the present specification, a USIM profile may be the same as the profile, or may describe information included in a USIM application within the profile that is packaged in a software form.

In the present specification, a profile providing server may be represented by subscription manager data preparation (SM-DP), subscription manager data preparation plus (SM-DP+), off-card entity of profile domain, a profile encryption server, a profile generation server, a profile provisioner (PP), a profile provider, and a profile provisioning credentials holder (PPC holder).

In the present specification, a profile information transfer server may be represented by a discovery and push function (DPF) and a subscription manager discovery service (SM-DS).

In the present specification, a profile management server may be represented by subscription manager secure routing (SM-SR), subscription manager secure routing plus (SM-SR+), off-card entity of eUICC profile manager, or a profile management credentials holder (PMC holder), and an eUICC manager (EM).

In the present specification, when naming the profile providing server, the profile providing server may be commonly described as including a function of the profile management server. Therefore, according to various embodiments of the present disclosure, that is, in the following technology, an operation of the profile providing server may be performed by the profile management server. Similarly, an operation of the profile management server or the SM-SR may be performed by the profile providing server.

In the present disclosure, a trigger system is a server which requests profile download preparation from the profile providing server. Generally, the trigger system may be a part of a business support system of a mobile carrier. Further, the trigger system may be implemented as the application of the terminal.

The term 'terminal' used in the present specification may be described as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. Various embodiments of the terminal may include a cellular phone, a smart phone having a wireless communication function, a personal digital assistant (PDA), a wireless modem, a portable computer having a wireless communication function, a photographing apparatus such as a digital camera having the wireless communication function, a gaming apparatus having the wireless communication function, home appliances for storing and playing music having the wireless communication function, and internet home appliances which may implement a wireless internet access and browsing. Various embodiments of the terminal may also include a portable unit or terminals in which combinations of the functions are integrated. Further, the terminal may include a machine to machine (M2M) terminal and a machine type communication (MTC) terminal/device, but is not limited thereto. In the present specification, the terminal may also be described as an electronic apparatus.

In the present specification, the electronic apparatus may have a UICC, which may download and install a profile, embedded therein. When the UICC is not embedded in the electronic apparatus, the UICC physically separated from the electronic apparatus may be inserted into the electronic apparatus to be connected to the electronic apparatus. For example, the UICC may be inserted into the electronic apparatus in a card form. The electronic apparatus may include the terminal. In this case, the terminal may be a terminal including the UICC which may download and install the profile. The UICC may be embedded in the terminal and when the terminal is separated from the UICC, the UICC may be inserted into the terminal and may be inserted into the terminal to be connected to the terminal. The UICC which may download and install the profile may be called the eUICC by way of example.

In the present specification, a profile discriminator may be called a profile identifier (profile ID), an integrated circuit card ID (ICCID), and a factor matched with an issuer security domain profile (ISD-P) or a profile domain (PD). The profile ID may represent unique identifiers of each profile.

In the present specification, an eUICC identifier (eUICC ID) may be a unique identifier of the eUICC embedded in the terminal and may be described as an EID. Further, when a provisioning profile is installed in the eUICC in advance, it may be a profile ID of the corresponding provisioning profile. Further, according to the embodiment of the present disclosure, when the terminal and the eUICC chip are not separated from each other, it may be a terminal ID. Further, it may also be described as a specific security domain of the eUICC chip.

In the present specification, a profile container may be described as the profile domain. The profile container may be the security domain.

In the present specification, an application protocol data unit (APDU) may be a message for interworking of the terminal with the eUICC. Further, the APDU may be a message for interworking of the PP or the PM with the eUICC.

In the present specification, profile provisioning credentials (PPC) may be a method which is used for mutual authentication and profile encryption between the PP and the eUICC and a signature. The PPC may include at least one of a symmetric key, a rivest shamir adleman (RSA) certificate and personal key, an elliptic curved cryptography (ECC) certificate and personal key, and a root certification authority (root CA) and certificate chain. Further, when the PP is plural, different PMCs for the plurality of PPs may be stored in the eUICC or used.

In the present specification, PMC may be a method which is used for mutual authentication and transmission data encryption between the PM and the eUICC and a signature. The PMC may include at least one of the symmetric key, the RSA certificate and personal key, the ECC certificate and personal key, and the root CA and certificate chain. Further, when the PM is plural, different PMCs for the plurality of PMs may be stored in the eUICC or used.

In the present specification, an AID may be an application identifier. This value may be a discriminator which discriminates different applications within the eUICC.

In the present specification, a profile package tag, length, value (TLV) may be called a profile TLV. The profile package TLV may be a data set which represents information configuring a profile in a TLV format.

In the present specification, an authentication and key agreement (AKA) may represent an authentication algorithm for accessing a $3^{rd}$ generation partnership project (3GPP) and 3GPP2 network.

In the present specification, K is an encryption key value stored in the eUICC which is used for the AKA authentication algorithm.

In the present specification, OPc is a parameter value which may be stored in the eUICC which is used for the AKA authentication algorithm.

In the present specification, a network access application program (NAA) may be application programs such as USIM and ISIM which are stored in the UICC for accessing a network. The NAA may be a network access module.

In the following description, when a detailed description of known functions or configurations related to the present disclosure may obscure the understanding of the present disclosure, the detailed descriptions thereof may be omitted.

FIG. 1 is a diagram illustrating a mobile communication connection method of a terminal using a UICC in which a profile is installed according to an embodiment of the present disclosure.

Referring to FIG. 1, a UICC 120 may be inserted into a terminal 110. In this case, the UICC may be a detachable type and may also be embedded in the terminal in advance. A fixed profile of the UICC in which the fixed profile is installed describes fixed 'access information' which may access a specific mobile carrier. The access information may be a so-called IMSI which is a subscriber discriminator and a K value or a Ki value which is required to authenticate a network along with the subscriber discriminator.

The terminal may use the UICC to perform the authentication along with an authentication processing system (so-called home location register (HLR) or authentication center (AuC)) of a mobile carrier. The authentication process may be an AKA process. If the authentication succeeds, the terminal may use a mobile communication network 130 of the mobile communication system to use mobile communication services such as a telephone or a use of mobile data.

FIG. 2 is a diagram illustrating a mobile communication connection method of a terminal using a UICC which may download and install a profile according to an embodiment of the present disclosure.

Referring to FIG. 2, a system for downloading and installing a profile may include a trigger system 210, a profile providing server 220, a profile information transfer server 230, a terminal 240, and a mobile carrier network 250.

The eUICC may be inserted into or embedded in the terminal 240. The profile may be downloaded to and installed in the eUICC. Further, the terminal 240 may use an Internet network to perform communication. The communication may be communication for downloading the profile. The communication may also be Wi-Fi, Bluetooth, or the like. The communication may also be a separate second mobile communication network access using the profile which is installed in the eUICC in advance. The communication may also be the second mobile communication network access using a profile installed in a UICC 2 or an eUICC 2 which is separately installed or mounted in the terminal 240 other than the eUICC. The second mobile communication network may be the same as or different from the mobile carrier network 250 of FIG. 2. That is, the mobile carrier network for downloading a profile and the mobile carrier network for providing a communication service using the downloaded profile may be the same as or different from each other.

Describing the operation of FIG. 2, in operation 260, the trigger system 210 may send a request for profile preparation to the profile providing server. The trigger system 210 may be a business support system (BSS) of the mobile carrier. The request may include at least one of the following information.

eUICC discriminator;
Information on profile information transfer server;
Profile discriminator or profile request type;
Profile installation key;
Terminal information; and
eUICC information.

The eUICC discriminator may be an EID.

The information on the profile information transfer server may include at least one of the following information.

Address or discriminator specifying one or a plurality of profile information transfer servers; and
Type of interworking with profile information transfer server.

The profile discriminator may be an ICCID or a value which may correspond thereto.

The profile request type is information which may be used to discriminate a kind of profile.

When the profile installation key is included, the profile providing server 220 may be information which may be used to specify a specific profile when the terminal uses the profile installation key to request the profile.

The terminal information is information which may also be used to discriminate whether the profile providing server 220 provides the profile or a kind of specific file.

The eUICC information is information which may also be used to discriminate whether the profile providing server 220 provides the profile or a kind of specific file.

In operation 265, the profile providing server 220 may prepare the profile. In this case, if a profile discriminator (so-called ICCID) value is transferred to the profile preparation request, the profile corresponding to the profile discriminator may be prepared. Further, if no profile discriminator is present, the profile may be discriminated by using at least one of the profile request type, the terminal information, the eUICC information, and the eUICC discriminator, and the profile discriminator thereof may be specified. In this case, the profile discriminator may be transmitted to a server transmitting the profile preparation request. Further, when the eUICC discriminator is included in the profile preparation request, the profile providing server 220 may download or install the specified profile only to and in the specific eUICC. When the eUICC discriminator is not included in the profile preparation request, the profile providing server may prepare the profile without interworking of the specified profile with the specific eUICC and when a suitable request including the eUICC discriminator is received from the terminal 240, the profile may also be downloaded by interworking of the profile with the corresponding eUICC.

Further, when the profile installation key is included in the profile preparation request, the profile providing server manages the profile installation key by interworking of the profile installation key with the specific profile, and when the terminal 240 requests the download of the profile to the profile installation key, the specific profile may also be downloaded. The profile installation key may also be described as an event identifier EventID or a matching identifier MatchingID, an activation code, or an activation code token AC_Token. When the profile installation key is not included in the profile preparation request, in the profile preparation, the profile providing server 220 may directly generate the profile installation key. In this case, after the profile preparation, the profile providing server 220 may also transfer the profile installation key to the trigger system 210.

In operation 270, the profile providing server 220 may transfer the profile information to the profile information transfer server 230. The profile information transfer may also describe the registration of the profile information in the profile information transfer server 230. The profile information transfer server 230 may receive the profile information and register the received profile information. When being registered as described above, the profile information may also be stored in the profile information transfer server 230.

The profile information may include all or a portion of the following information.

Address of profile providing server;
Profile installation key; and
eUICC information.

The address of the profile providing server may be a server address in a full qualified domain name (FQDN) type, an address in a full uniform resource locator (URL) type, or an address of an IP server.

The eUICC information may be a specific EID, a value providing a hash function operation result to the specific EID, or an EID. The hash function operation for the EID describes a calculation including a hash operation. For example, the EID may be performed once based on the hash function, the EID may be performed twice based on the hash function, or secret code information may also be added with the EID as a factor of the hash function. The secret code may also be a value transferred to a user.

As described above, if the profile information is transferred to or registered in the profile information transfer server 230, in the following operation 275, the profile information may be transferred to the terminal 240 which is connected to the eUICC corresponding to the eUICC information. The transfer of the profile information to the terminal 240 may be performed by one of the following methods.

In a first method, if the terminal 240 requests the profile information from the profile information transfer server 230 using the address of the profile information transfer server stored in the terminal 240 or the eUICC (for example, transmission of a profile information request message), the profile information transfer server 230 transfers the corresponding information to the terminal (for example, transmission of a profile information response message) when there is profile information corresponding to the received eUICC information in the operation 270 using the transferred eUICC information.

In a second method, the terminal 240 may be registered in the profile information transfer server 230 in advance using the address of the profile information transfer server stored in the terminal 240 or the eUICC in advance. The information transferred upon the registration may include the following information.

eUICC information; and

Information to enable the profile information transfer server to transfer information to the terminal.

The information to enable the profile information transfer server to transfer information to the terminal may be one of the following information.

IP address and port information of terminal; and

Information on information transfer server and information transfer token information pre-registered in terminal.

The pre-registered information on the information transfer server may be another information transfer server connected and established based on an IP in advance to allow the terminal 240 to receive the profile information. The information transfer server may provide the information transfer token information to the terminal 240 for establishing an interface, and if the terminal 240 transfers the information transfer token to the profile information transfer server 230, the profile information transfer server 230 may transfer the profile information and the information transfer token to the information transfer server to allow the information transfer server to transfer the profile information to the terminal 240 corresponding to the information transfer token.

When the profile information is transferred from the profile providing server 220 to the profile information transfer server 230, the profile information transfer server 230 may transfer the profile information to the registered terminal 240.

Further, for the first and second methods, the profile information may also be information in a type encoded with a quick response (QR) code. The terminal 240 may decode the information in the type encoded with the QR code to acknowledge the profile information.

If the terminal 240 receives the profile information, in operation 280, the terminal 240 may use the address of the profile providing server and the profile installation key included in the profile information to request the provision of the profile to the profile providing server 220. The terminal 240 may transmit a profile request message to the profile providing server 220. In detail, the terminal 240 may use the FQDN address of the address of the profile providing server included in the profile information to get the IP address from a domain name server and request the provision of the profile to the corresponding IP address. In this case, the terminal 240 may directly transfer the profile installation key to the profile providing server 220 or may authenticate the profile providing server 220 and then provide the installation key to the profile providing server 220. In this case, the authentication process may be the following process by way of example.

The terminal 240 generates a eUICC random value 1 or a terminal random value having a sufficient length and provides the generated eUICC random value 1 or the terminal random value to the profile providing server 220. The profile providing server 220 uses a personal key corresponding to a digital certificate of the profile providing server 220 to calculate a digital signature value and transfers the digital signature value to the terminal 240 along with the certificate.

The terminal 240 verifies whether the certificate is issued from an organization having authority to issue a certificate and then if the verification passes, uses the certificate to verify the signature. If the signature is verified and thus the signature is accurate, it may be determined that the authentication process succeeds.

The operation of generating the eUICC random value or the terminal random value and verifying the certificate and signature may be performed by the terminal 240 or the eUICC.

The terminal 240 may also transfer encryption key generation data, which may be used for the encryption of the profile, to the profile providing server 220. The encryption key generation data may be transferred along with the signature value generated by the eUICC and the digital certificate of the eUICC. The digital certificate may be transferred along with an eUICC manufacture (EUM) certificate issuing the certificate. The signature value generated by the eUICC may include the calculated signature, including the random value of the profile providing server received from the profile providing server 220.

Thereafter, prior to operation 285, the profile providing server 220 may verify the signature value transferred from the terminal 240.

The verification process may be as follows by way of example.

The received EUM certificate is verified as a public key of a reliable root certificate issuer (CI) or a public key of the root certificate CI which is stored in the profile providing server 220.

If the EUM certificate is successfully verified, the received eUICC certificate is verified using the public key of the EUM certificate.

If the eUICC certificate is valid, the received signature value is verified using the public key of the certificate.

If it is determined in the verification process that the EUICC certificate is not valid, the profile providing server 220 does not download the profile to the terminal 240 and may end the operation. The profile providing server 220 may notify the terminal 240 of a verification failure result.

If all the verification is valid, the profile providing server 220 may use the received encryption key generation data and the profile encryption key generation data generated by the profile providing server to generate an encryption session key. The encryption session key may be an SCP03t session key, an SCP03 session key, or an SCP11 session key.

Returning to FIG. 2, in the operation 285, the profile providing server 220 may transfer the profile to the terminal 240. The profile providing server 220 may use the encryption session key to encrypt the profile or use a randomly generated encryption key to encrypt the profile and then encrypt the random encryption key with the encryption session key and transfer the encrypted random encryption key to the terminal 240. The terminal 240 may download and install the profile to and in the eUICC.

In operation 290, the terminal 240 may install the profile and then activate the profile. By the profile enablement, an opening procedure for using a communication service through the download of the profile to the terminal 240 may end.

In operation 295, the terminal 240 may use the profile installed in the EUICC to authenticate the mobile communication system and then use the mobile communication network.

By the process of FIG. 2, the terminal 240 may download the profile to the eUICC in real time and may use the communication service. According to the embodiment of the present disclosure, the profile information may be automatically transferred to the terminal 240 and the terminal 240 may use the profile information to automatically request the profile from the profile providing server 220. Further, the authentication and verification processes for the profile download of the terminal 220 and the profile providing server 220 may be provided.

According to an embodiment of the present disclosure, the profile providing server 220 may be a server which is operated by a mobile carrier or an eUICC manufacturer and the profile information transfer server 230 may be a server which is operated by a mobile telecommunication service provider or an eUICC or terminal manufacturer. Upon the manufacturing of the eUICC in the profile download using the eUICC, it is not defined whether to download the profile of any of the network providers. This may be determined according to whether the user is subscribed in the communication service of any of the network providers. Therefore, a user accesses a server operated by the network provider of the subscribed communication service to download the profile, but may not know information thereon upon the generation of the eUICC. As a result, it is essential to get the address of the profile providing server for downloading the profile. According to the embodiment of the present disclosure, the terminal 240 may receive the profile information from the profile information transfer server 230 which is the server operated by the eUICC or the terminal manufacturer at the time of the downloading of the profile and request the profile from the profile providing server 220 corresponding to the profile information in real time.

Figure 3A:
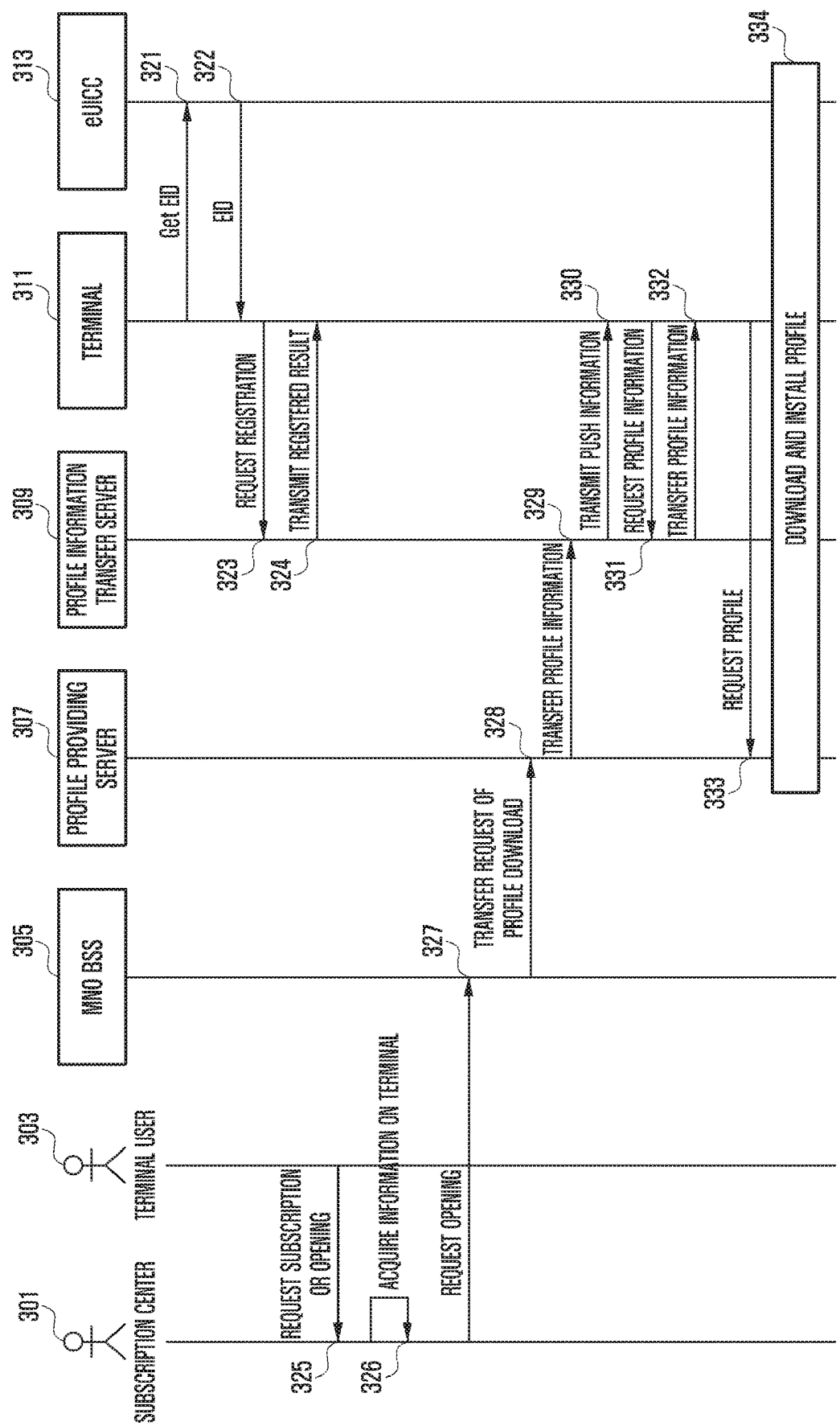
FIG. 3A is a diagram illustrating a mobile communication connection method of a terminal using a UICC which may download and install a profile according to an embodiment of the present disclosure.

FIG. 3A is a diagram illustrating a mobile communication connection method of a terminal using a UICC which may download and install a profile according to an embodiment of the present disclosure.

Referring to FIG. 3A, in operation 325, a terminal user 303 visits a subscription center 301 to request the subscription or the opening. The terminal user 303 may visit a point of sale (PoS) to request the subscription or the opening to an agent. In operation 326, the information on the terminal that the terminal user 303 requests the subscription or the opening from the PoS terminal may be acquired. The information on the terminal may be identification information such as a QR code, a bar code, and a serial number. For example, the agent may use the PoS terminal to scan the QR code displayed on a box of the terminal or a screen. The QR code may include at least one of the following information.

EID; and

DPF ID (identification information on profile information transfer server).

The EID is the eUICC discriminator.

The DPF ID may be a discriminator which may correspond to the FQDN address, the URL address, or the IP address of the profile information transfer server.

Thereafter, in operation 327, the PoS terminal may transfer an opening request to a mobile network operator business support system (MNO BSS) 305 of a mobile carrier. The opening request may transfer the EID and DPF address.

In operation 328, the MNO BSS 305 may perform an internal procedure (for example, register IMSI information in HLR) requiring the opening and then transfer a profile download request to the profile providing server 307. The profile providing server 307 may be SM-DP+. The profile download request may correspond to the profile preparation request of FIG. 2.

In operation 329, the profile providing server 307 may transfer the profile information to the profile information transfer server 309. The profile information transfer server 309 may receive the profile information and register the received profile information. The profile information may include the address of the profile providing server and the eUICC information. The address of the profile providing server may be a server address in an FQDN type, an address in a full URL type, or an address of an IP server. The eUICC information may be a specific EID, a value providing a hash function operation result to the specific EID, or an EID. The operation of FIG. 3A corresponds to the operation 270 of FIG. 2 and therefore other detailed descriptions refer to the operation 270 of FIG. 2.

In operation 330, the profile information transfer server 309 transfers push information to a terminal 311. The push information may be push notification. The profile information transfer server 309 retrieves the information corresponding to the eUICC information of the profile information based on the profile information received from the profile providing server 307. The profile information transfer server 309 may store or register the eUICC related information in advance. For example, by operations 321, 322, 323, and 324 of FIG. 3A, the profile information transfer server 309 may get the eUICC related information.

In the operation 321, the terminal 311 requests the EID from an eUICC 313 of the terminal. In the operation 322, the eUICC 313 provides the EID to the terminal 311. In the operation 323, the terminal 311 may request the registration of the eUICC related information from the profile information transfer server 309. For example, the terminal 311 may provide the EID of the eUICC 313 or the hash function operation result of the EID and request the storage or registration thereof to the profile information transfer server 307. In the operation 324, the profile information transfer server 307 may transmit the registered result to the terminal 311.

As described above, by the operations 321 to 324, the profile information transfer server 307 may get the eUICC related information. When registering or storing the eUICC related information corresponding to the profile information received in the operation 329, the profile information transfer server 307 may transmit the push information to the corresponding terminal 311.

In operation 331, the terminal 311 receiving the push information requests the profile information from the profile information transfer server 309. The terminal 311 may transmit the profile information transfer request message. In operation 332, the profile information transfer server 309 may transmit the profile information to the terminal 311. The operation 331 may be performed without receiving the push information at operation 330. In other words, when the terminal is manually operated in the terminal user 303 or the subscription center 301, the operation 332 may also be performed and may also be performed by other conditions.

In operation 333, the terminal 311 may use the profile information to request the profile. The terminal 311 may use the received profile information to request the profile from the profile providing server 307. For example, the terminal 311 may transmit the profile request message to the profile providing server 307. The operation of FIG. 3A corresponds to the operation 280 of FIG. 2, and therefore other detailed descriptions refer to the operation 280 of FIG. 2.

In operation 334, a terminal may download the profile and install the downloaded profile. The authentication and verification operation for downloading a profile refers to the following description of the operation 280 of FIG. 2.

The terminal 311 may activate the installed profile and use the activated profile to use a communication service through the mobile communication network. The detailed operation thereof refers to the description of the corresponding operation in FIG. 2.

The operation of FIG. 2 may be applied to FIG. 3A and the description of FIG. 3A corresponding to FIG. 2 refers to the description of FIG. 2.

Figure 3B:
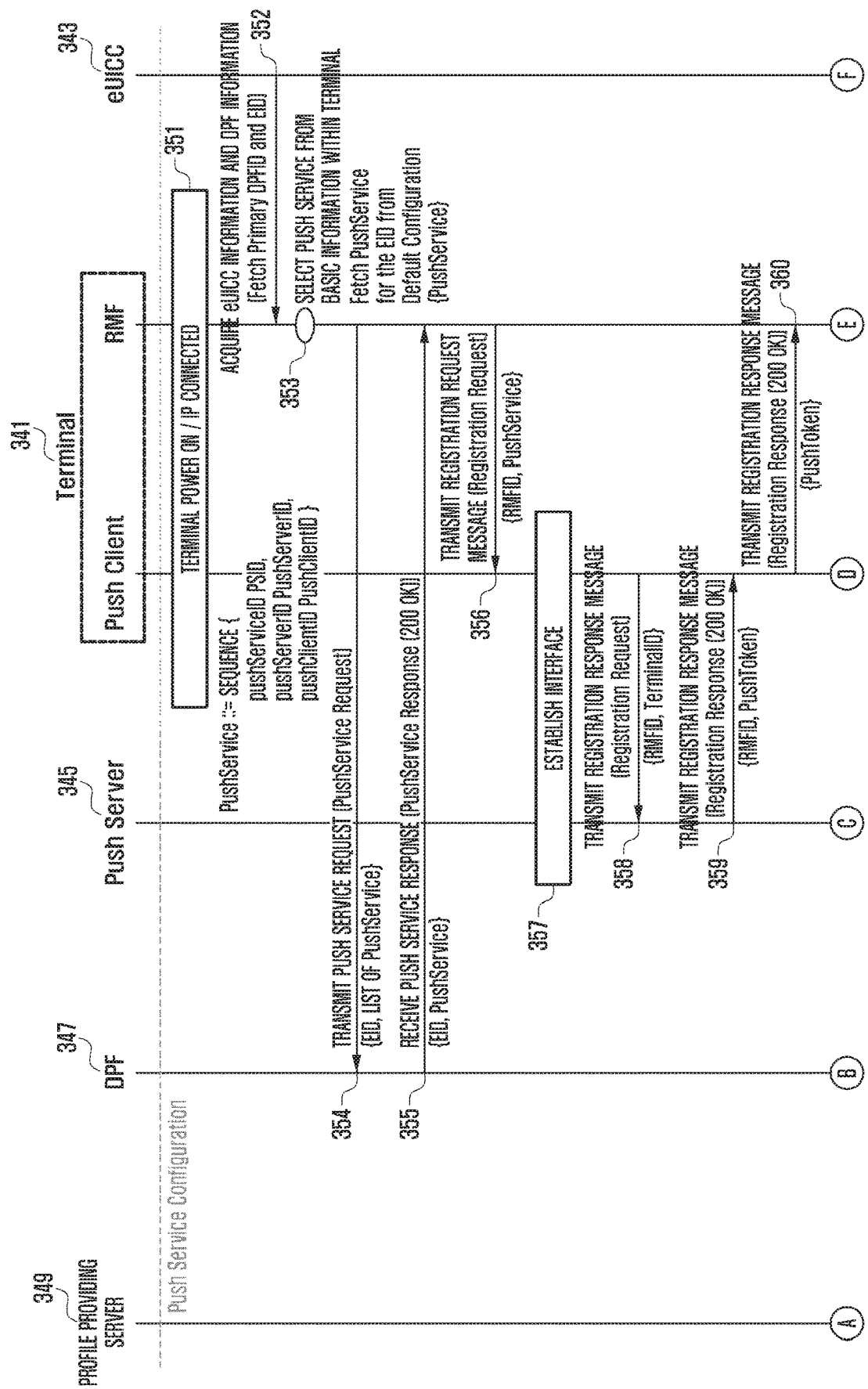
FIGS. 3B to 3D are diagrams illustrating a portion of an operation of FIG. 3A according to an embodiment of the present disclosure.
Figure 3C:
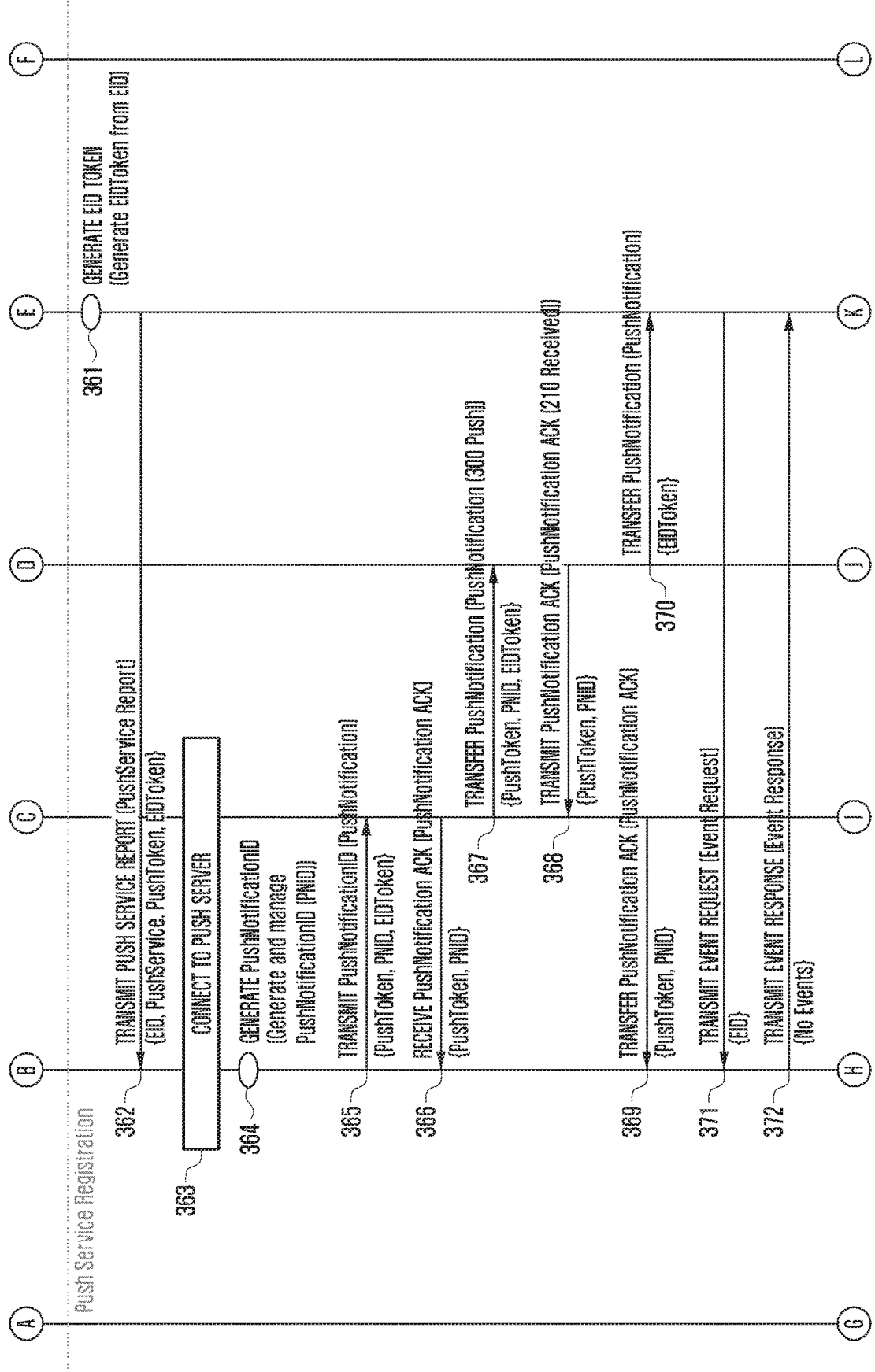
Figure 3D:
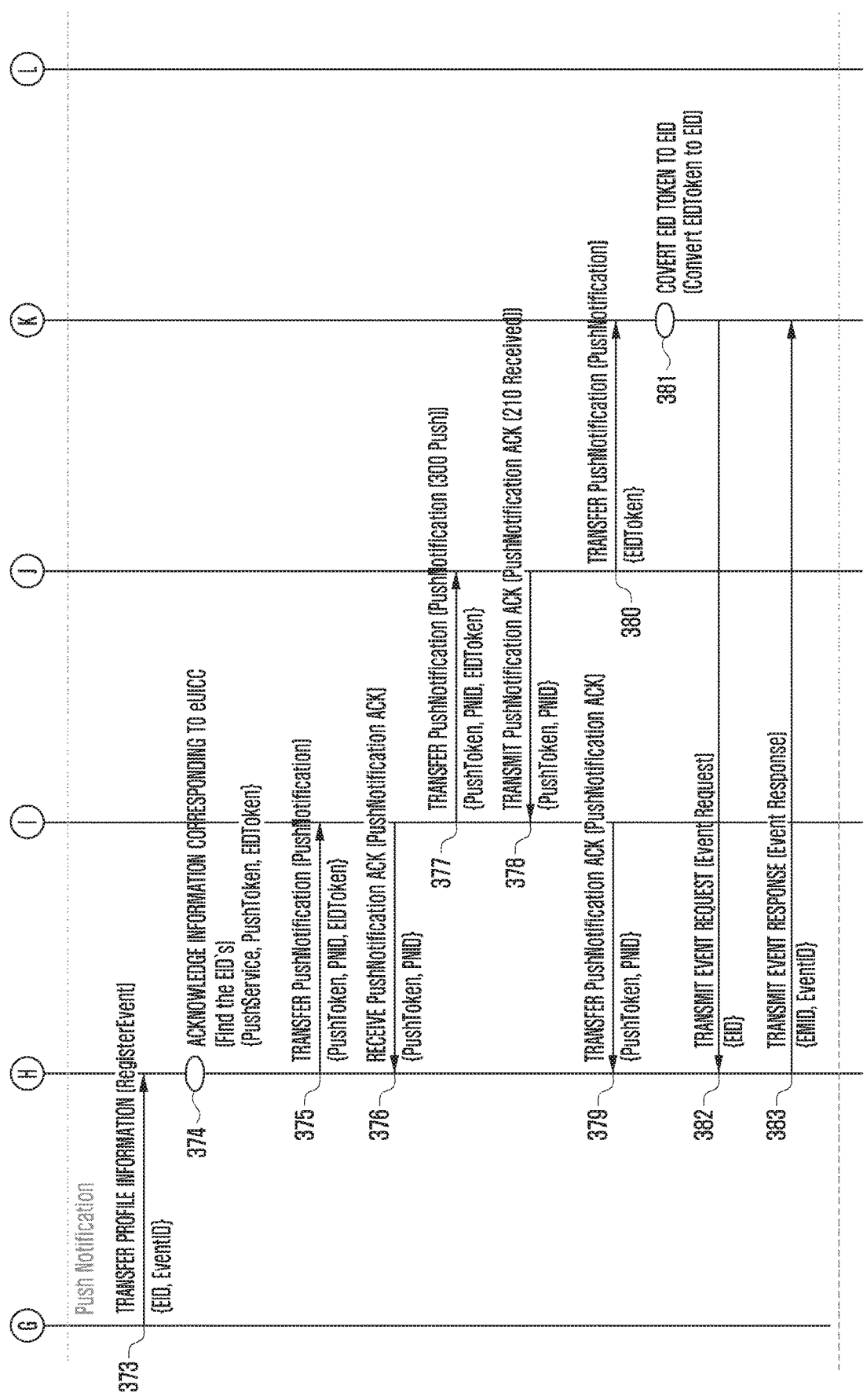

FIGS. 3B to 3D are diagrams illustrating in detail a portion of an operation of FIG. 3A according to an embodiment of the present disclosure.

Referring to FIGS. 3B to 3D, an example of the operations 321 to 324 and 329 to 332 in FIG. 3A will be described in greater detail.

Referring to FIG. 3B, an internal operation of a terminal 341 may be described, being divided into a push client and a remote management function (RMF). Further, a profile information transfer server (DPF) 347 may interwork with an additional push server 345, and the push server 345 may interwork with a push client of the terminal 341. The following operation of the push client and the RMF corresponds to the operation of the terminal.

In operation 351, if a power supply of the terminal 341 is turned on, the terminal may be connected to the Internet.

In operation 352, the terminal 341 may read the eUICC information and the DPF information from an eUICC 343. The eUICC information may be the EID and the DPF information may be the DPF ID.

In operation 353, the RMF may read basic establishment information stored in the terminal 341 to select a push service.

In operation 354, the terminal 341 may transmit a push service request message to the DPF 347. In operation 355, the terminal 341 may transmit a push service request message to the DPF 347. A push response message may include push establishment information.

The terminal may read the establishment information obtained on line to select the push service.

The information may include at least one of a pushServiceID, a pushServerID, and a push Client ID. For convenience, the corresponding information is called PushService information.

In operation 356, the RMF of the terminal may request the registration in the push client of the terminal. A registration request may include at least one of RMFID and PushService. In the case of a 3rd party push service, the RMF may interwork with the push client corresponding to the push service ID. However, the RMF may be combined with the client.

In operation 357, the push client may establish an interface with the push server 345. The detailed procedure may be different for each push service. The push client needs to keep the connection while the Internet connection of the push server 345 with the terminal is normal.

In operation 358, the push client transfers a registration request message to the push server 345. The registration request message may include the terminal discriminator and the RMFID. The RMFID may be an ID discriminating applications.

In operation 359, the push server 345 may transmit the push response message to the terminal 341. The push server 345 may issue a push token corresponding to a pair of terminal and RMF and transfer the issued push token to the push client.

In operation 360, the push client may transmit a registration response message to the RMF. The push client may transmit the push token to the RMF. The push token may be transmitted to the DPF 347 to be used as a usage for transmitting the push notification to the terminal.

Referring to FIG. 3C, in operation 361, the terminal 341 may generate an EIDToken from the EID. The EIDToken may be a hashed EID.

In operation 362, the terminal 341 may transmit a PushService Report to the DPF 347. The terminal 341 may use the push service report to register the push service. The push service report may include at least one of the EID, the PushService information, the PushToken, and the EIDToken.

In operation 363, the DPF 347 may interwork with the push server 345. In this case, the interworking may be based on a scheme of keeping the connection.

In operation 364, the DPF 347 may generate PushNotificationID (PNID).

In operation 365, the DPF 347 may transfer information including at least one of PushToken, PNID, and EIDToken to the push server 345. The DPF 347 may transmit the PushNotificationID including at least one of the PushToken, the PNID, and the EIDToken to the push server 345.

In operation 366, the push server 345 may transfer PushNotification ACK to the DPF 347.

In operation 367, the push server 345 transfers the push notification to the terminal 341. The push server 345 may use the PushToken to specify a specific push client and then transfer the push notification to the terminal. The push notification may include at least one of the PushToken, the PNID, and the EIDToken.

In operation 368, the terminal 341 may transfer the PushNotification ACK to the push server 345. The PushNotification ACK may include at least one of the PushToKen and the PNID.

In operation 369, the push server 345 may again transfer the PushNotification ACK to the DPF 347. The PushNotification ACK may include at least one of the PushToKen and the PNID.

In operation 370, the push client may transfer the push notification to the RMF. The push notification may include the EID token.

In operation 371, the terminal 341 may use a pre-established DPF address to transmit an event request to the DPF 347. The event request may include the EID.

In operation 372, the DPF 347 may transfer the registered event information included in the event response to the terminal 341. In the above example, since the DPF 347 does not yet have an event for the corresponding terminal 341, a discriminator indicating that the event is not present (no event) may be transferred.

Referring to FIG. 3D, in operation 373, the profile providing server 349 may transfer the profile information to the DPF 347. The operation 373 may correspond to the operation 329 of FIG. 3A.

In operation 374, the DPF 347 acknowledges the push service information, the push token, the EIDToken, or the like, which correspond to the corresponding eUICC 343.

In operation 375, the DPF 347 transfers the push notification to the corresponding push server 345 based on the acknowledged information. The push notification may include at least one of the PushToken, the PNID, and the EIDToken.

In operation 376, the push server 345 may transfer the PushNotification ACK to the DPF 347.

In operation 377, the push server 345 transfers the push notification to the terminal 341. The push server 345 may use the PushToken to specify the specific push client and then transfer the push notification to the terminal. The push notification may include at least one of the PushToken, the PNID, and the EIDToken.

In operation 378, the terminal 341 may transfer the PushNotification ACK to the push server 345. The PushNotification ACK may include at least one of the PushToKen and the PNID.

In operation 379, the push server 345 may again transfer the PushNotification ACK to the DPF 347. The PushNotification ACK may include at least one of the PushToKen and the PNID.

In operation 380, the push client may transfer the push notification to the RMF. The push notification may include the EID token.

In operation 381, the terminal 341 may convert the EIDToken to the EID.

Operation 382 may correspond to operation 331 of FIG. 3. In operation 382, the terminal 341 transmits the event request to the DPF 347. The event request may include the EID.

In operation 383, the DPF 347 may transmit the event response to the terminal 341. The event request may include EMID and EventID. Unlike the operation 372, since there is the event received from the profile providing server 349, the operation 383 may receive the address and the EventID of the profile providing server which may process the corresponding event.

Thereafter, as illustrated in FIG. 2 or 3A to 3D, the profile download may also be progressed. Further, a remote control procedure described in the embodiment of FIGS. 9A and 9B below may also be progressed.

Figure 4:
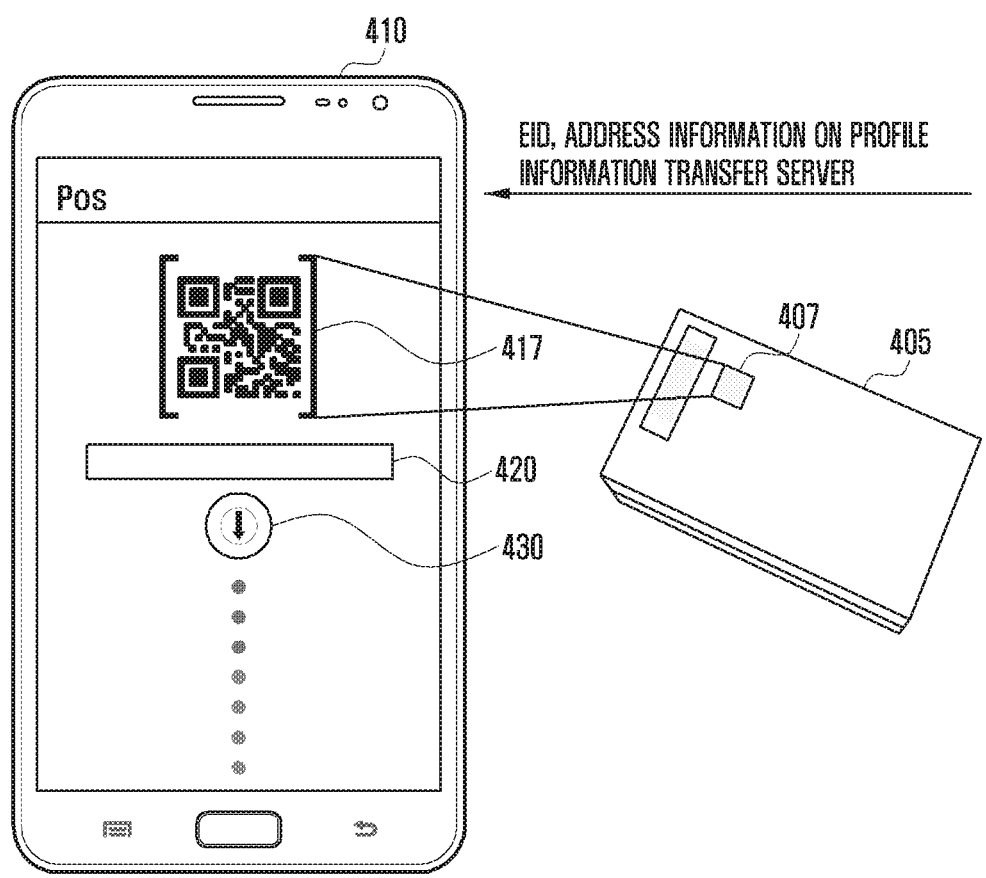
FIG. 4 is a diagram illustrating an operation of a point of sale (PoS) terminal used in a process of downloading and installing a profile of FIGS. 3A to 3D according to an embodiment of the present disclosure.

FIG. 4 is a diagram illustrating an operation of a PoS terminal used in a process of downloading and installing a profile of FIGS. 3A to 3D according to an embodiment of the present disclosure.

Referring to FIG. 4, upon performing the operation 360 of FIG. 3B, an operation example of a PoS terminal 410 and an example of a box design 405 of the terminal are shown. Code information 407 may be displayed in the box design 405 of the terminal to get the information on the terminal. In the code information 407, information such as a QR code, a two-dimensional bar code, a one-dimensional bar code, and a serial number may be displayed. As the code information 407, at least one of the EID of the eUICC included in the terminal and the address information of the profile information transfer server may be encoded. The PoS terminal 410 may use a code information ACK technology (for example, QR code reader, bar code reader, optical character recognition (OCR) reader, and the like) to scan the code information 407, thereby acquiring the information on the terminal. The PoS terminal 410 may display a scan result of the code information 407 in a code information identification region 417 and display a code information identification result in a display region 420. The display region 420 may also be omitted.

An opening request input region 430 may also be displayed in the PoS terminal 410. The opening request includes one requesting to transfer the information on the terminal to the MNO or the MNO BSS. If there is an input to the opening request input region 430, like the operation 365 of FIG. 3C, the PoS terminal 410 may transfer the information on the terminal to the BSS system of the MNO. That is, the EID or the identification information (address information) of the profile information transfer server may be transferred to the MNO BSS.

Figure 5:
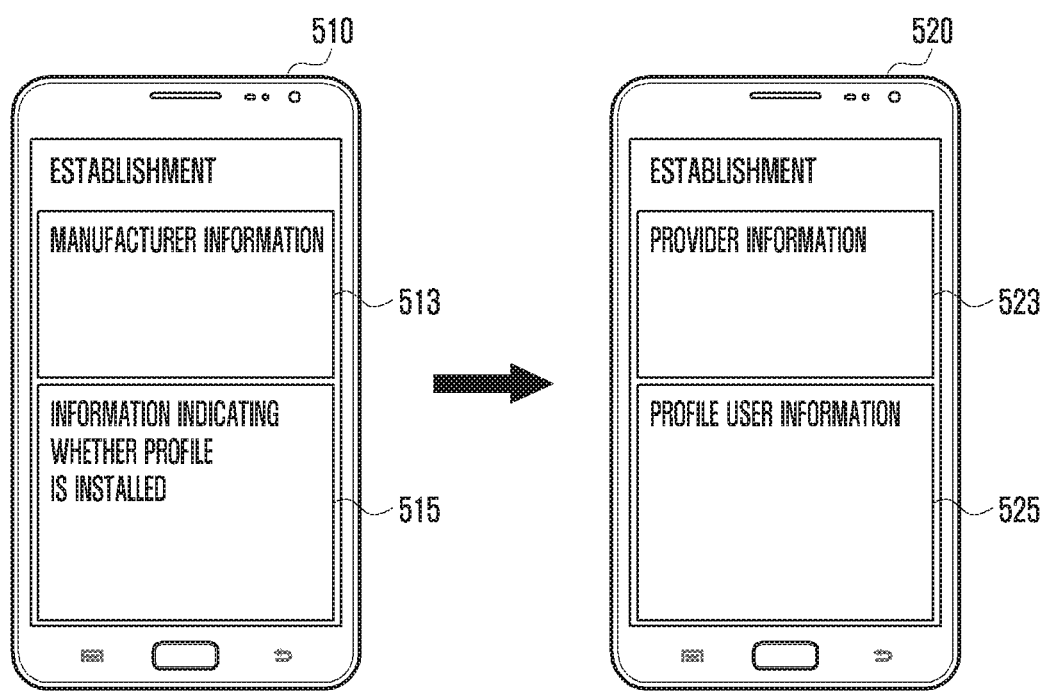
FIG. 5 is a diagram illustrating a screen of a terminal before and after a profile is installed according to an embodiment of the present disclosure.

FIG. 5 is a diagram illustrating a screen of a terminal before and after a profile is installed according to an embodiment of the present disclosure.

Referring to FIG. 5, reference numeral 510 represents the screen of the terminal before the profile is installed and reference numeral 520 represents the screen of the terminal after the profile is installed. Referring to reference numeral 510, information on the eUICC manufacturer may be represented in a first region 513 before the profile is installed. The eUICC manufacturer and the terminal manufacturer may be the same as or different from each other. Whether the profile is installed or activated may be represented in the second region 515. Reference numeral 510 is an operation before the profile is installed and therefore may represent information which may represent whether the profile is currently installed, such as no profile, no installation of profile, and no profile enable.

Referring to reference numeral 520, if the profile is installed, the screen may be changed compared to reference numeral 510. The provider information of the installed profile may be represented in a third region 523. The provider information may be a name of a network provider corresponding to the installed profile. The user information of the installed profile may be represented in a fourth region 525. The information of a name, a telephone, or the like, of a user corresponding to the subscription information of the user may be represented.

Figure 6A:
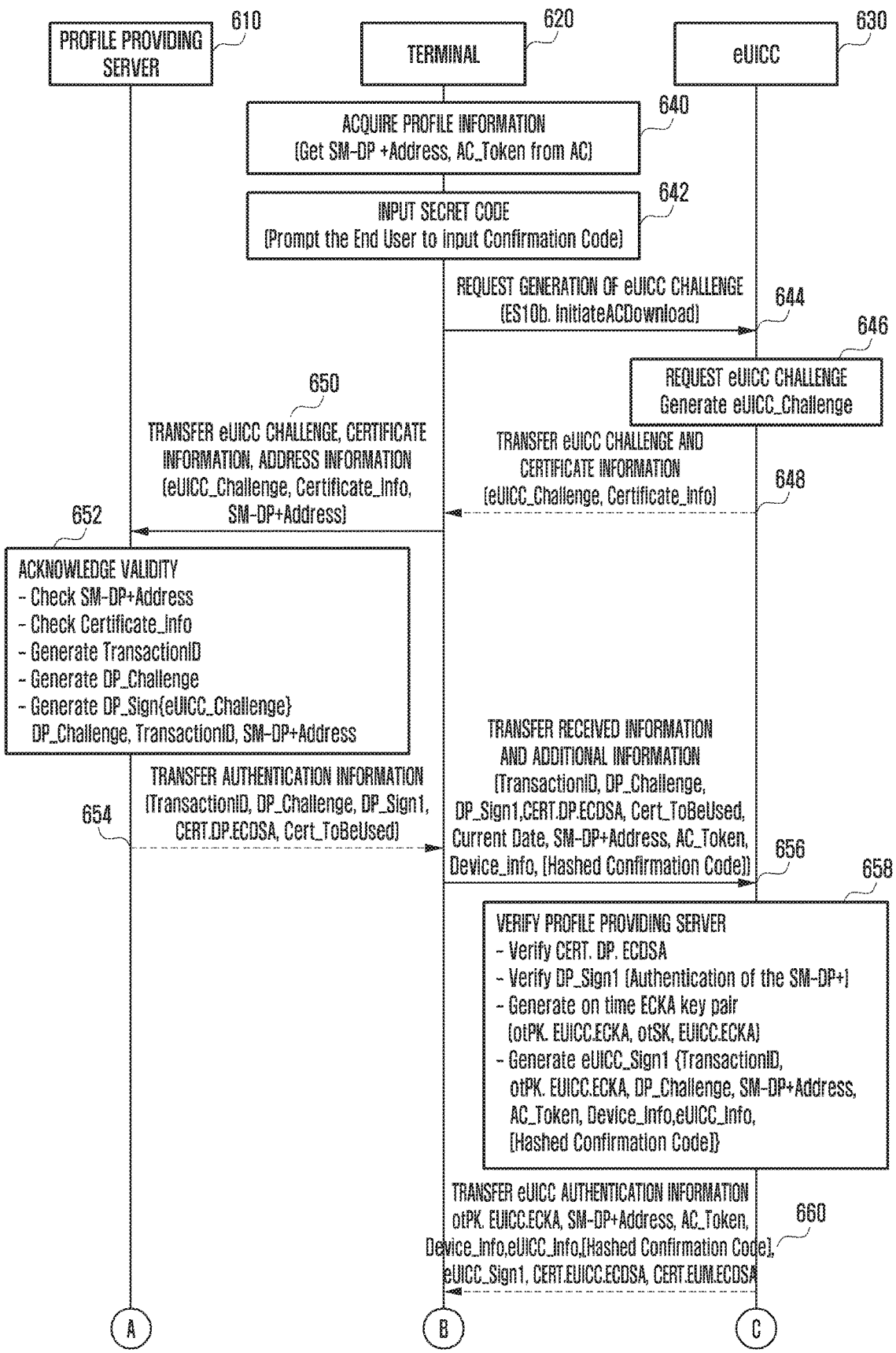
FIGS. 6A and 6B are diagrams illustrating a detailed operation of a process of downloading and installing a profile according to an embodiment of the present disclosure.
Figure 6B:
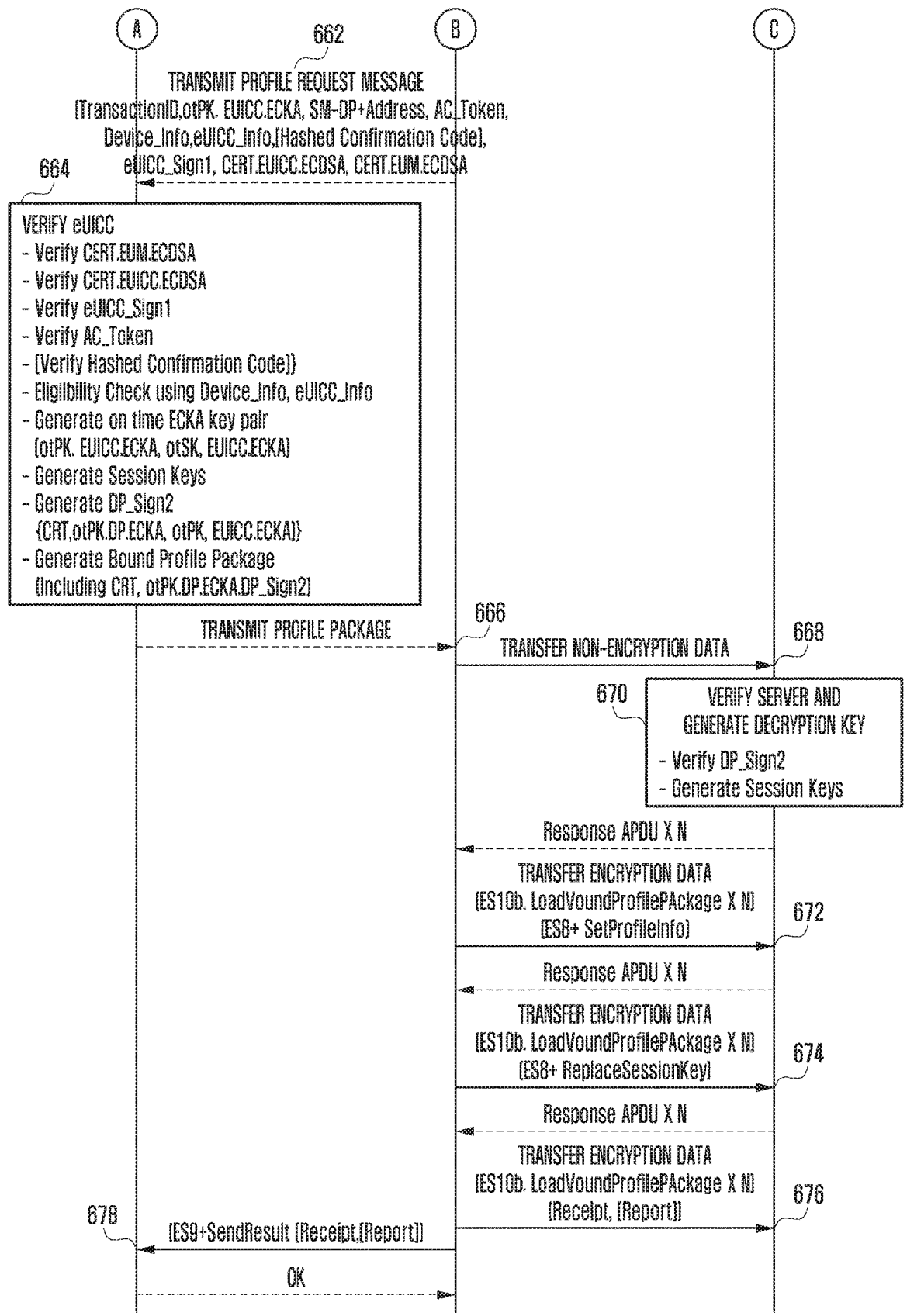

FIGS. 6A and 6B are diagrams illustrating a detailed operation of a process of downloading and installing a profile according to an embodiment of the present disclosure.

FIGS. 6A and 6B illustrate in detail an example of the operations after the operation 280 of FIG. 2 and the operation 380 of FIG. 3D. Therefore, the operation of FIGS. 6A and 6B may be an operation which may be applied to FIGS. 2 to 3D.

Referring to FIG. 6A, in operation 640, a terminal 620 may get profile information. The terminal 620 receives the address and the profile installation key of the profile providing server from the profile information transfer server. According to the embodiment of FIG. 6A, an eUICC 630 is inserted into or embedded in the terminal 620 and the operation of the terminal 620 and the eUICC 630 may be analyzed as the internal operation of the terminal.

In operation 642, the terminal 620 may input a secret code using the obtained profile installation key information. Operation 642 is not essential and if there is no secret code, may not be performed as an option.

In operation 644, the terminal 620 requests a generation of an eUICC challenge from the eUICC 630.

In operation 646, if the terminal 620 requests the generation of the eUICC challenge, the eUICC 630 generates the eUICC challenge and then stores it.

In operation 648, the eUICC 630 transfers the generated eUICC challenge and certification information Certificate_Info to the terminal 620. The certification information Certificate_Info may include a kind of eUICC certificates and a kind of usable encryption keys. The encryption key information may describe an elliptic curved parameter. The encryption key information may be plural and may separately include information to be used to generate a signature and information used to verify the signature.

In operation 650, the terminal 620 may transfer the eUICC challenge and the Certificate_Info additionally including the address information of the profile providing server included in the profile information to a profile providing server 610 corresponding to the address information.

In operation 652, the profile providing server 610 may check whether the received profile providing server is valid. It may be checked whether the received profile providing server is valid by verifying whether the received address information of the profile providing server is the same as its own server address or acknowledging whether the received address information of the profile providing server corresponds to any of a plurality of valid addresses. If the process of checking whether the received profile providing server is valid fails, the profile providing server 610 may transfer an error code to the terminal 620 and stop the operation of downloading a profile.

The profile providing server 610 may also check the Certificate_Info. It may be checked whether the certificate type is valid. Further, it may be checked whether the encryption key information may be supported by the profile providing server 610. The check may be a process of comparing whether the encryption key information for the signature of the eUICC 630 coincides with the encryption key information which may be verified by the profile providing server 610 with whether the encryption key information for the verification by the eUICC 630 coincides with the encryption key information used to generate the signature by the profile providing server 610. If the check process is valid, the profile providing server 610 may store the certificate type to be used and the encryption information and then generate a transaction ID. The profile providing server 610 may acknowledge whether the next request message from the terminal 620 is valid by using the transaction ID. The transaction ID may also be an event identifier EventID. The profile providing server may then generate a DP challenge. The DP challenge may be a challenge of the SM-DP or a challenge of the profile providing server. The DP challenge may be a 16 byte random number. The profile providing server 610 may then generate DP_Signal. The DP_Signal may be a signature value generated by the profile providing server 610, in which the signature value includes eUICC_Challenge, DP_Challenge, TransactionID.

If the operation 652 is normally performed, the profile providing server 610 may transfer the authentication information to the terminal 620 in the operation 654. The profile providing server 610 may transfer the transaction ID, the DP challenge, the DP_Signal, a certificate of a profile providing server, and Cert_ToBe_Used information to the terminal 620. The certificate of the profile providing server may be an elliptic curved digital signature algorithm (ECDSA). The Cer_ToBe_Used may be information including the certificate type and the encryption information which are stored in the profile providing server 610.

In the operation 656, the terminal 620 may transfer a current time of the terminal, the address of the profile providing server, the profile installation key, the terminal information, the hashed secret code to the eUICC 630, in addition to the received information. In this case, the hashed secret code may be transferred when the operation 642 is performed. Further, prior to performing the operation 656, the terminal 620 may map and store the transaction ID and the address of the profile providing server together.

In operation 658, the eUICC may verify the profile providing server based on the received information. The eUICC 630 verifies the certificate of the profile providing server. The verification may be a signature verification scheme using a CI certificate or a public key of the CI certificate which are stored in the eUICC 630. The signature verification may be verification using the public key selected by using the information included in the Cert_ToBe_use. If the verification passes, the eUICC 630 verifies the received Sign_DP1. The verification may be a signature verification using the public key included in the certificate of the profile providing server. If the verification passes, the eUICC 620 authenticates the profile providing server.

The terminal may then generate a key pair of a disposable public key and a personal key. The key pair of the public key and personal key is separately generated at different values even by the profile providing server. When only the public key among the so generated values is swapped with each other, a session key may be shared by combining the public key with the personal key. In this case, the public key becomes disposable, and therefore a new session key may be shared whenever the profile is downloaded. In this case, to safely transfer the public key, the signature value calculated using the public key is transferred. For this purpose, the eUICC 630 may perform a signature using the personal key pre-stored in the eUICC 630, including the received DP challenge along with the disposable public key of the eUICC 630. The signature is performed including the DP challenge, and thus the profile providing server 610 may authenticate the eUICC 630. The signature may include at least one of the transaction ID, the address of the profile providing server, the profile installation key, the terminal information, the eUICC information, and the hashed secret code value in addition thereto to additionally verify the profile providing server 610. For convenience, the signature is called eUICC Signal. Upon the generation of the signature, the signature may be generated by selecting the personal key of the eUICC which matches the certification type and the encryption key information used in the received Cert_ToBe_Used.

In operation 660, the eUICC 630 may transfer eUICC authentication information to the terminal 620. The eUICC authentication information may include at least one of the disposable public key of the eUICC, the address of the profile providing server, the profile installation key, the terminal information, the eUICC information, the hashed secret code value, the eUICC Signal, the eUICC certificate, and the eUICC manufacturer certificate issuing the eUICC certificate.

Referring to FIG. 6B, in operation 662, the terminal 620 may transmit the profile request message to the profile providing server 630. The profile request message transmitted to the profile providing server 630 may include the eUICC authentication information received from the eUICC 630. The terminal 620 may transfer at least one of a transaction ID which is the address of the profile providing server corresponding to the stored transaction ID prior to performing the operation 656, the disposable public key of the eUICC, the address of the profile providing server, the profile installation key, the terminal information, the eUICC information, the hashed secret code value, the eUICC Signal, the eUICC certificate, and the eUICC manufacturer certificate issuing the eUICC certificate to the profile providing server 610.

In operation 664, after it is acknowledged whether there is a valid transaction ID by acknowledging the transaction ID received in the operation 662, if not present, the profile providing server 610 may return the error code to the terminal 620 and end the download process. The valid transaction ID may indicate that the transaction ID is stored in a repository or a memory of the profile providing server to be inquired, and an example of the operation of the profile providing server corresponding to the transaction ID may be that the operation 654 is performed but a message corresponding to the operation 662 is first received. However, when the message of the operation 662 is already received and the message of the operation 662 is received using the same transaction ID, in some cases, the error code may not return. For example, when a second profile request message is transmitted while the operation 664 to be described later is performed on the message first received in the operation 662, the error code for the second profile request message does not return but the second message may be discarded.

Thereafter, for the profile request determined as the normal transaction, the profile providing server 610 may verify the eUICC. The profile providing server 610 may verify the eUICC manufacturer certificate. The verification may be based on a scheme of verifying an eUICC manufacturer certificate by first extracting and using the public key from the CI certificate stored in the profile providing server 610 or directly using the stored public key. Thereafter, the profile providing server 610 may use the public key of the certificate extracted from the manufacturer certificate to verify the signature value included in the received eUICC certificate, thereby verifying the eUICC certificate. Thereafter, the profile providing server may use the public key included in the verified eUICC certificate to verify the eUICC Signal value. In this case, if the verification passes, the profile providing server 610 authenticates the eUICC 630.

Thereafter, the profile providing server 610 may verify whether the profile installation key AC_Token is valid. This may be a process of acknowledging whether the corresponding profile installation key is included in the value stored in the repository of the profile providing server and whether there is the downloadable profile corresponding to the stored profile installation key. Further, if necessary, the profile providing server 610 may verify the hashed secret code. This may be based on a scheme of simply comparing with the stored hashed secret code and a scheme of calculating and comparing a newly hashed secret code. Thereafter, the profile providing server 610 may compare the terminal information, the eUICC information, or the like, to additionally determine whether the profile may be installed. The information may also include accessible network ending and installable memory region information.

Only when the verification passes, may the profile providing server 610 approve the profile download and then perform the following process. If the verification fails, the profile providing server 610 returns a return code to the terminal 620 and may end the process of downloading a profile. In this case, the transaction ID and the DP challenge which are stored prior to ending the download process are deleted. If the verification ends, as described later, the profile providing server 610 may generate the key pair of a disposable public key of the profile providing server and a secret key. The encryption key information used to generate the disposable asymmetric key pair needs to use the encryption key included in the Cert_ToBe_Used received in the operation 654. As described above, the profile providing server 610 may generate the session key using the secret key and the received disposable public key of the eUICC. For the generation of the session key, certificate (CRT) information and EID information may be additionally used. Further, the profile providing server 610 may generate DP_Sign2. The DP_Sign2 is a signature value using the pre-stored personal key of the profile providing server and may be a calculation of the signature value for the value including the disposable public key of the eUICC. Further, the profile providing server 610 may use the generated session key to generate the encrypted profile package. The encrypted profile package may be generated by one of the following two methods.

In a first method, encrypting is performed using a SCP03t encryption scheme with the session key generated for the profile package which is not encrypted.

In a second method, encrypting is performed by combining the encryption profile package encrypted with a random key randomly pre-generated for the non-encrypted profile package with an encryption random key obtained by encrypting the random key with the generated session key.

The encrypted profile package may further include the CRT which may be used to generate the session key of the eUICC, the disposable public key of the profile providing server, and the generated DP_Sign2.

Thereafter, in operation 666, the profile providing server 610 may transfer the encrypted profile package to the terminal 620.

In operation 668, the terminal 620 may transmit the profile package to the eUICC 630. The terminal 620 may transfer non-encryption data in the profile package. The terminal 620 may discriminate non-encrypted data from a plurality of encrypted data in the encrypted profile package and segment the non-encrypted data into a size at which the non-encrypted data may be transmitted to the eUICC, and transfer the segmented non-encrypted data to the eUICC 630. The transfer method may be a method of using STORE DATA APDU.

Further, the discrimination of the non-encrypted data may be based on a scheme of discriminating a tag value included in the encrypted profile package. The tag value is first 1 byte or 2 bytes data in the encrypted profile package and acknowledges length bytes to discriminate and transfer a boundary of end of the non-encrypted data.

The non-encrypted data may include the CRT, a disposable DP public key, and a DP_Sign2 value.

In operation 670, the eUICC may verify the signature and generate a decoding key. The eUICC 630 may verify the DP_Sign2. This may be a signature verification scheme using the pre-acknowledged public key of the certificate of the profile providing server. If the verification passes, the eUICC 630 may generate the session key for decoding the encrypted profile package using the received CRT, the disposable public key value of the profile providing server, the EID value, and the disposable personal key value of the eUICC stored only in the eUICC.

In operation 672, the terminal 630 acknowledges data after the boundary of the non-encrypted data which is discriminated at the time of performing the operation 668 as the encrypted data and when it acknowledges whether a specific tag is present to determine a tag indicating the encrypted data, acknowledges the next length byte to acknowledge a size of the encrypted data, and transfers the acknowledged data corresponding to the encrypted data to the eUICC 630. In this case, the encrypted data may be separately transmitted to the eUICC 630 using a store data command.

Thereafter, in operation 674, the terminal 610 may perform a process similar to operation 672 on the next encrypted data. In this case, by the process of transmitting the described encryption random key when the package encrypted by the second method in operation 664 is generated, when the eUICC 630 receives the encryption random key, for the next encryption data, the eUICC 630 may decode the encryption random key with the session key to extract the random key and then use the random key as the session key decoding the following encryption data.

Thereafter, in operation 676, the terminal 620 may acknowledge another tag value and the length byte discriminating the encryption data to discriminate a plurality of encryption data and may transfer each of the encryption data to the eUICC 630 using a plurality of store data commands.

The eUICC performs the decoding on each of the encrypted data using the session key or the decoded random key, and then installs the profile in an installable unit using profile installable unit information included therein. The installable unit information unit information is installed to perform the decoding of the next encrypted data. If the transmission and the decoding of all the encrypted data and the installation of all the installable unit information are completed by repeating the operation, the eUICC 630 may transfer the corresponding result to the terminal 620 and the result may be transferred even to the profile providing server 610 in operation 678.

In the embodiment of the present disclosure, the terminal and the eUICC are separately described, but the eUICC can be included in or inserted into the terminal. Therefore, in the embodiment of the present disclosure, the operation between the terminal and the eUICC may also be analyzed as the internal operation of the terminal including the eUICC.

According to the operation as described above, the authentication and verification for the eUICC and the profile providing server, the download of the profile package, the transfer of the profile package, and the profile installation operation may be performed.

If the profile installation operation ends, the terminal 610 may transfer an enable command of the profile to the eUICC 630 to enable the profile and performs the authentication for the mobile communication system as in operation 295 of FIG. 2 by using the enabled profile and then if the authentication passes, may use the mobile communication network.

Figure 7:
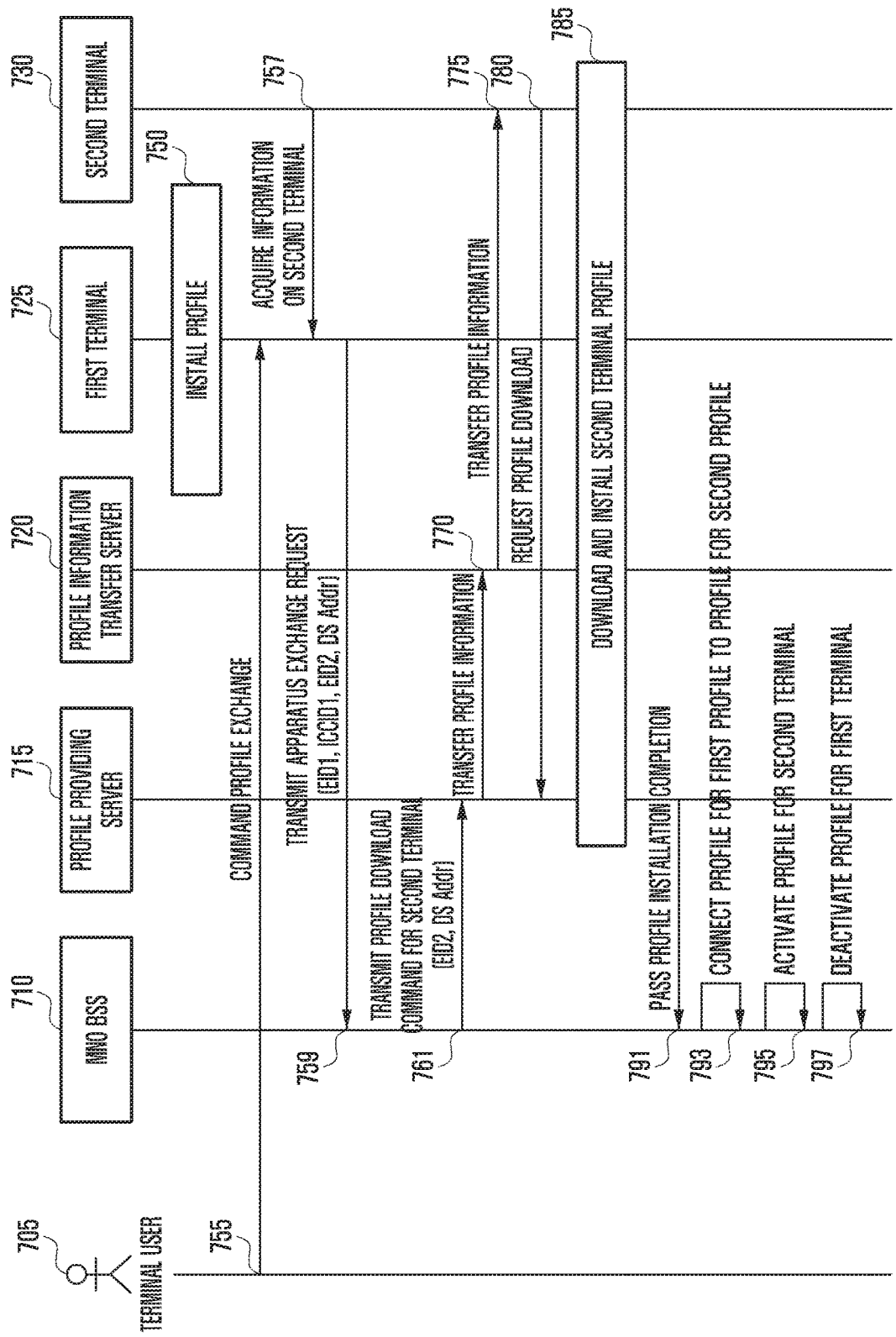
FIG. 7 is a diagram illustrating a process of swapping a profile according to an embodiment of the present disclosure.

FIG. 7 is a diagram illustrating a process of swapping a profile according to an embodiment of the present disclosure.

Referring to FIG. 7, in operation 750, it is assumed that a first terminal 725 includes the eUICC in which the profile where the profile discriminator is ICCID1 is installed.

In operation 755, a terminal user 705 may select the profile (profile where the profile discriminator is the ICCID1) from a menu of the first terminal 725 to select a transfer menu. The transfer menu may also be called a device swap. That is, in operation 755, a profile swap command and a device swap command may be input.

In operation 757, the first terminal 725 may get the EID and/or DFP address information of a second terminal 730. A screen of the first terminal 725 may guide a method for acquiring the EID of the second terminal 730 and the address information of the profile information transfer server to the user, and get the EID of the second terminal and the address information of the profile information transfer server. The method may be as follows.

In a first method, if the bar code, the QR code, or the two-dimensional bar code in which the EID and/or the address information of the profile information transfer server represented in the screen or the box of the second terminal 730 is scanned by a camera of the first terminal 725, the information is decoded by the first terminal 725 to get the EID and the address of the profile information transfer server corresponding to the second terminal 730.

In a second method, after a Bluetooth pairing process is selected by selecting the information corresponding to the second terminal 730 among Bluetooth connection terminal information represented after a connection of near field communication (for example, Bluetooth) is selected on the screen of the first terminal 725, the EID of the second terminal 730 and the address information of the profile information transfer server are transferred from the second terminal 730 to the first terminal 725 through the Bluetooth.

In operation 759, the first terminal 725 may transmit a device swap request message. As described above, if the first terminal 725 gets the information on the second terminal 730, the first terminal 725 may send request the device swap to an MNO BSO 710 system. The device swap may also be transferred by the profile providing server after the mutual authentication process of a profile providing server 715 and the first terminal 725 is performed, and may be performed after the user may perform the authentication processes such as ID/password (PW) authentication, single sign on authentication, fingerprint authentication, a secret code history, and an input of the profile installation key through a web portal page provided by the MNO BSS 710 system.

In operation 761, the MNO BSS 710 system may transmit the profile download command for the second terminal 730 to the profile providing server 715. If it is determined that the device swap request sent to the MNO BSS 710 system is suitable, the MNO BSS 710 system may request a profile installation corresponding to a new profile discriminator ICCID2 for the second terminal 730 by the profile providing server 715.

In operation 770, the profile providing server 715 transfers the profile information on the second terminal 725 to the profile information transfer server 720. In operation 775, the profile information transfer server 725 transfers the received profile information to the second terminal 730. In operation 780, the second terminal 730 requests the profile download from the profile providing server 715 based on the received profile information. In operation 785, the second terminal 730 may download a profile from the profile providing server 715 to install the profile. The operations 770 to 785 of FIG. 7 correspond to the operations 270 to 285 of FIG. 2 and therefore the detailed operation refers to the description of FIG. 2.

In operation 791, the profile providing server 715 may notify the MNO BSS 710 that the profile installation of the second terminal 730 is completed.

In operation 793, the MNO BSS 710 may connect the profile information corresponding to the ICCID2 to subscription information corresponding to the profile stored in the existing first terminal 725 and in operation 795, may activate the corresponding profile. The enablement may be achieved by performing the provisioning of the appropriate information so that MNO mobile communication systems such as an HLR system and an AuC system may use the mobile communication service using the profile. The appropriate information may be IMSI, K value, or the like, and if not, may be one changing a state value of a simple flag value.

Further, in operation 797, the MNO BSS 710 may deactivate the profile corresponding to the ICCID1 to enable one terminal to use a service. The MNO BSS may also delete the profile of the first terminal by a process similar to the procedure of downloading a profile in real time. An order of the operations 793 to 797 may be changed and some of the operations may be omitted, added or combined.

Figure 8:
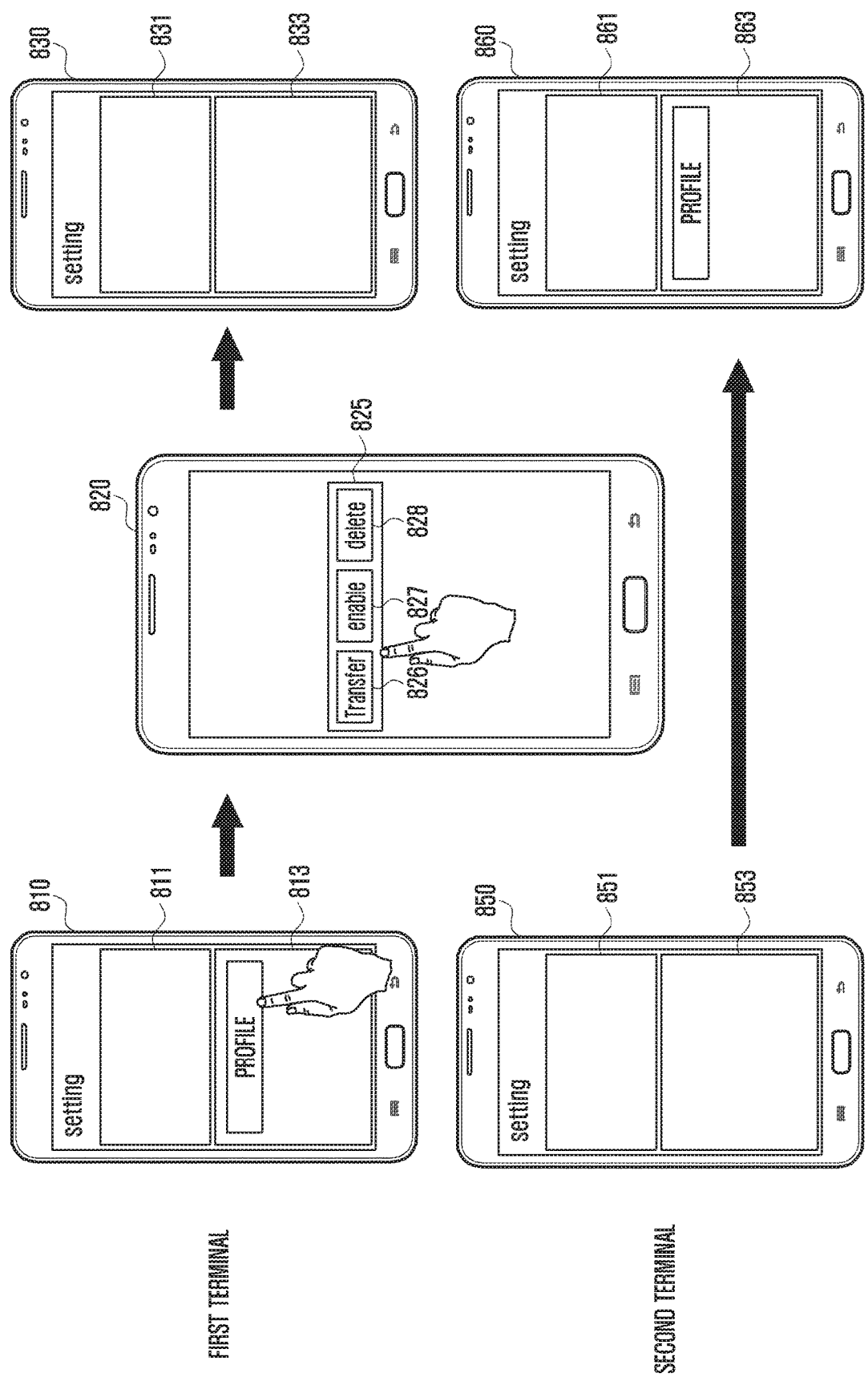
FIG. 8 is a diagram illustrating a screen of a first terminal and a second terminal according to the embodiment of FIG. 7.

FIG. 8 is a diagram illustrating a screen of a first terminal and a second terminal according to the embodiment of FIG. 7.

Referring to FIG. 8, reference numeral 810 is a screen of a first terminal in the operation 750 of FIG. 7, and reference numeral 850 is a screen of a second terminal in the operation

750 of FIG. 7. In the screen 810, the information on the eUICC manufacturer of the first terminal may be displayed in a first region 811 of the eUICC of the first terminal. The information on the profile installed in the first terminal may be displayed in a second region 813 of the first terminal. It is assumed that the profile is installed in the first terminal, and therefore the information on the profile installed in the first terminal may be displayed. The information on the profile displayed in the second region 813 may be selected by the user. The information on the eUICC manufacturer of the second terminal may be displayed in a first region 851 of the second terminal and the information on the profile installed in the second terminal may be displayed in a second region 853 of the second terminal. Since it is assumed that the profile is not installed in the second terminal, the information representing that there is no installed profile may be displayed in the second region 853.

If the information on the profile displayed in the second region 813 of the first terminal is selected, a screen like reference numeral 820 may be displayed in the first terminal. A third region 825 of the first terminal is a profile management region. A region 826 indicating the device swap or the profile swap may be displayed in the profile management region. Further, a region 827 in which the profile is activated, a region 828 in which the installed profile is deleted, or the like, may be additionally displayed. If the user input is present in each display region, the corresponding operation may be performed.

If the user input is present in the region 826, a message indicating the device swap or the profile swap corresponding to operation 755 of FIG. 7 may be transferred to the MNO BSS.

Thereafter, the operations after 760 of FIG. 7 are performed and thus, the profile may be deactivated or deleted in the first terminal and the profile may be installed in the second terminal. As a result, in the screen of the first terminal, like reference numeral 830, the information on the eUICC manufacturer may be displayed in a region 831 and the corresponding information may be displayed in a region 833 due to the disable or the profile deletion. In the screen of the second terminal, like reference numeral 860, the information on the eUICC manufacturer may be displayed in a region 861 and the information on the installed profile may be displayed in a region 863.

Figure 9B:
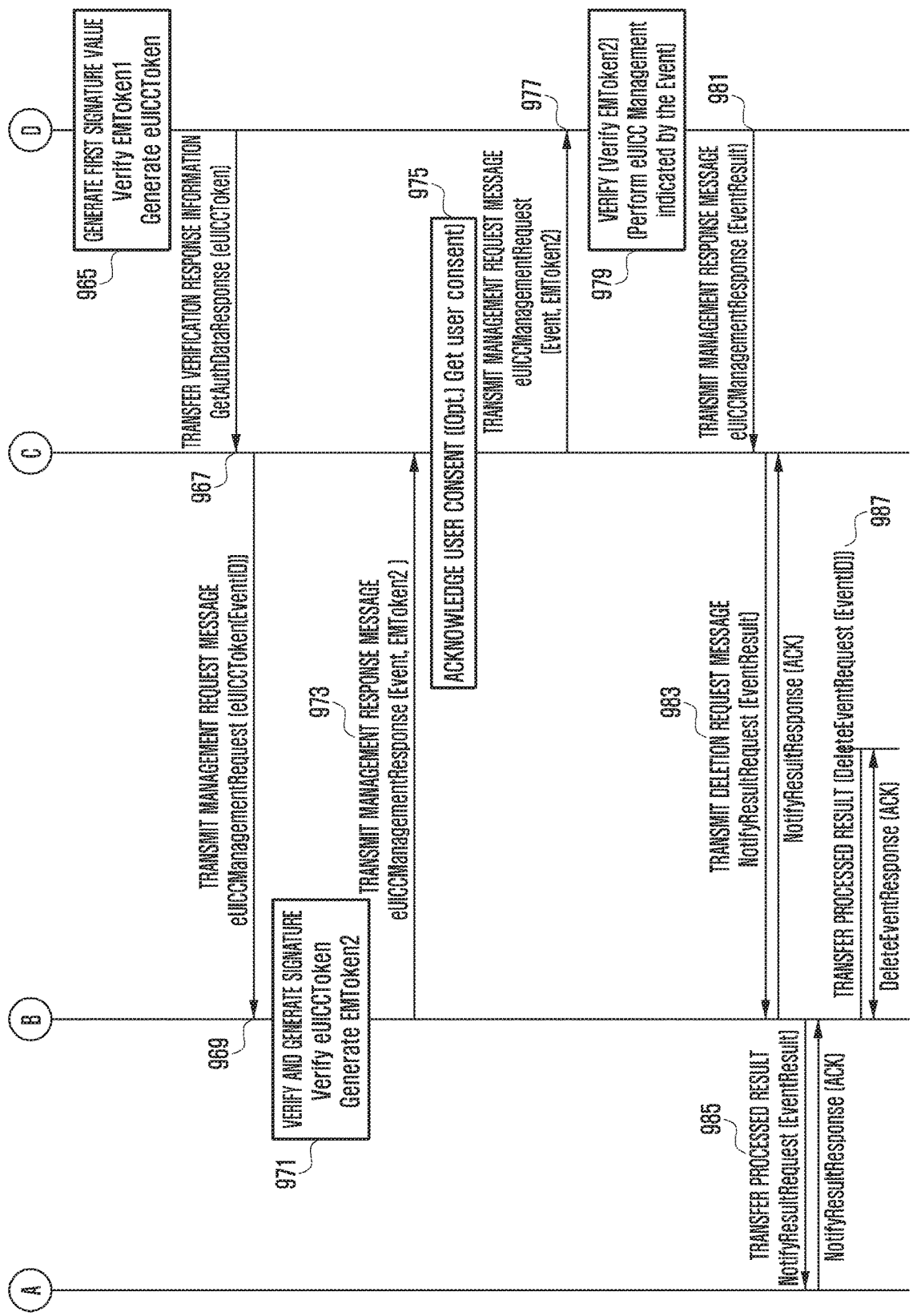

FIGS. 9A and 9B are diagrams illustrating a method for changing information on a profile information providing server according to an embodiment of the present disclosure.

In the embodiment of FIGS. 9A and 9B, it is assumed that the profile information providing server is the DPF. The case in which a profile management server performs the following operations is described below, but the operation of the profile management server may also be performed by the profile control server. The profile management server may be an EM by way of example.

Referring to FIGS. 9A and 9B, the provider system (MNO in FIGS. 9A and 9B) may change the DPF information (that is, including the address information) stored in the specific eUICC remotely. The change of the DPF server address is to consider various situations such as the case of changing and processing the server address depending on regulations of a specific area when the address of the DPF server is fixed in the terminal. In this case, although not illustrated in the drawings, the change may be controlled only by the specific profile management server or the specific profile providing server. In this case, the information determining that the specific server may be possible may be stored in the eUICC. The information stored in the eUICC may be a portion of the information included in the certificate which is stored in the certificate of the server. For example, the information may be a subject name, a common name, a subject identifier, or a certificate serial number. The information type may be an FQDN, a domain name, or an object identifier (OID). A procedure of changing DPF information will be described with reference to FIGS. 9A and 9B.

Referring to FIG. 9A, in operation 941, an MNO BSS 910 may transfer an eUICC remote management request message to a profile management server 915. In this case, the remote management request message includes a remote management type value describing the change of the DPF address, and transfers the DPF information (or DPF ID or at least one DPF address) to be changed. In operation 943, the profile management server 915 (or profile providing server or profile control server) generates an event ID used until the processing for the corresponding request is completed. In operation 945, the profile management server 915 transmits an event ID value to the MNO BSS 910. That is, the event ID value returns.

Thereafter, in operation 947, the profile management server 915 transmits an event request registration message RegisterEventRequest to the profile information transfer server 920. The profile management server 915 may transfer the eSIM information, the address of the profile management server, and the EventID information to a profile information transfer server 920. The address of the profile management server and the EventID may be the same type as the profile installation information of FIG. 2. In operation 949, the profile information transfer server 920 may notify the profile management server 915 of the normal reception of the transfer. For example, the normal reception of the transfer may be notified by an event response registration message RegisterEventResponse. When the normal reception message is not received for a predetermined time, the profile management server 915 may again perform the operation 947.

In operation 951, the profile information transfer server 920 transfers the push information to a terminal 925. The push information may be push notification. The profile information transfer server 920 may transfer a message (push information) indicating that there is information for remotely managing the profile in the terminal 925 to the terminal 925. In operation 953, the terminal 925 transfers the eSIM information to the profile information transfer server 920. The eSIM information may be the information on the EID of an eUICC 930 or the hash function applying information of the EID. The eSIM information may be transmitted by being included in an event identifier request message EventIDRequest.

In operation 955, the profile information transfer server 920 transfers a response message to the terminal 925. The response message may be an event identifier response message EventIDResponse. The terminal 925 may receive the address of the profile management server and the EventID from the profile information transfer server 920. The operations 951 to 953 may be based on the same method as the method used in the operation 275 of FIG. 2.

In operation 957, the terminal 925 may transfer the EventID to the profile management server 915. The terminal 925 may also transmit an event request EventRequest including the EventID to the profile management server 915. The operation 957 may include eUICC_Challenge generated and included in operations 644 to 650 of FIGS. 6A and 6B.

In operation 959, the profile management server 915 may generate a first signature value of the profile management server. The first signature value is a signature including the eUICC_Challenge. The first signature value may be EMToken1.

In operation 961, the profile management server 915 transfers the event response message EventResponse to the terminal 925. The profile management server 915 may generate the first signature value and SR Challenge and transfer the event response message including the first signature value and the SR Challenge to the terminal 925.

In operation 963, the terminal 925 may transfer the first signature value SR_Sign1 of the profile management server, an EventType value representing new address information (for example, DPF address information) of the profile information transfer server, and an SR Challenge value to the eUICC 930. The terminal 925 may transfer the information to the eUICC 930 while including the information in a verification request message GetAuthDataRequest.

Referring to FIG. 9B, in operation 965, the terminal 925 may verify the SR_Sign1. The eUICC of the terminal 925 may verify the SR_Sign1. The verification process may be the same as or similar to the signature process of the operation 658 of FIGS. 6A and 6B.

The eUICC 930 may generate the eUICC_sign1. The eUICC_sign1 is the signature value and may be one signed including the SR Challenge value.

In operation 967, the eUICC 930 may transfer a verification response message GetAuthDataResponse to the terminal 925. The eUICC 930 then returns to the terminal 925, including the signature value eUICC_Sign1 or eUICCToken.

In operation 969, the terminal 925 requests the eUICC management from the profile management server 915, including the signature value eUICC_Sign1. For example, the terminal 925 may transmit a management request message eUICCManagementRequest.

In operation 971, the profile management server 915 may verify the signature value eUICC_Sign1. The process of verifying a signature of the server may be the same as or similar to the operation 664 of FIGS. 6A and 6B.

The profile management server 915 may generate the Event information changing the DPF address and the SR_Sign2 in which the value is signed.

In operation 973, the profile management server 915 may transmit a management response message eUICCManagementResponse to the terminal 925. The management response message may generate the Event information changing the DPF address and the SR_Sign2 in which the value is signed.

In operation 975, the terminal 925 may additionally acknowledge a user consent. The process may be the operation 975 before the operation 953, before the operation 963, and after the operation 967. The operation 975 may be an optional operation.

In operation 977, the terminal 925 may transfer the information received by the profile management server 915 to the eUICC 930. The terminal may transfer a management request message eUICCManagementRequest including the information received in the operation 973 from the profile management server 915 to the eUICC 930.

In operation 979, the eUICC 930 may verify the SR_Sign2 information included in the received information. By the verification, the signature including the received data, the data known by the eUICC 930, and the EventID may be verified.

In operation 981, if the verification passes, the eUICC 930 may update the DPF information using the received information and then transfer the processed result EventResult to the terminal 925. The eUICC may transmit a management response message eUICCMangmentResponse including the processed result to the terminal 925.

In operation 983, the terminal 925 may notify the profile management server 915 of the corresponding result. For example, a NotifyResultRequest message including the processed result may be transmitted to the profile management server 915.

In operation 985, the profile management server 915 may also transfer the corresponding result received from the terminal 925 to the MNO BSS 910. Further, the profile management server 915 may receive the response message to the reception of the processed result from the MNO BSS 910.

After the processing ends, in operation 987, the profile management server 915 may delete the information transfer request registered in the profile information transfer server 920. For example, the profile management server 915 may transmit a delete request message DeleteEventRequest. The profile information transfer server 920 may transmit a delete response message DeleteEventResponse to the profile management server 915.

As described above, even though the mutual authentication procedure passes, it is to be noted that the eUICC may receive and process only the request through the specific profile management server or the profile control server by the additional server information establishment.

Further, the following additional remote control may be performed by a mechanism similar to FIGS. 9A and 9B.
Remote Profile Enable;
Remote Profile Disable;
Remote Profile Deletion;
Get Profile Registry;
Update Profile Registry;
Get eUICC Policy Rule;
Update eUICC Policy Rule; and
Reset eUICC Memory.

The remote control may be performed by the same control process as FIGS. 9A and 9B. In this case, an EventType of the event response message transmission of operation 961 may be changed according to a kind of remote controls. In the operation 961, the EventType indicating that the DPF information is updated is described as an example. Further, in the management request message response 973, additional information matching the EventType may be transferred. The description of FIGS. 9A and 9B relates to the remote control of updating the DPF information, and therefore the DPF information is included. In the case of the control indicating the policy rule update among the control examples, the policy rule may be included in the event of the management request message response 973.

The remote profile enable indicates that the profile installed in the eUICC of the specific terminal is enabled remotely (in other words, business support system of a mobile carrier). If the profile is enabled in the eUICC, the terminal may use the information stored in the profile to access the network of the mobile carrier, thereby receiving a service.

The remote profile disable indicates that the profile installed in the eUICC of the specific terminal is disabled remotely. The terminal may use the corresponding profile just before or after the profile disable to block an access to the mobile communication network which is already accessed. If the specific profile of the terminal is disabled, the eUICC may automatically enable other profiles.

The remote profile deletion may indicate that the specific profile is deleted remotely. When the remote profile deletion tries to delete the currently enabled profile, the terminal may not process the profile deletion. Further, when the remote profile deletion tries to delete the currently enabled profile, the terminal first disables the corresponding profile and then process the corresponding profile deletion.

Further, when the profile which is an object of the remote profile deletion is a unique profile which may access the mobile communication service among the profiles installed in the eUICC, the terminal may not process the profile deletion.

The acquisition of the profile information is a control to allow the remote server to get the information on all or some of the profiles installed in the eUICC. The information may include at least one of the profile discriminator discriminating the specific profile, the ICCID, the profile name, the provider information, and the eUICC discriminator.

The profile information update is a control to allow the remote server to get the specific information on all or some of the profiles installed in the eUICC. The information may include at least one of the profile discriminator discriminating the specific profile, the ICCID, the profile name, the provider information, and the eUICC discriminator.

The acquisition of the eUICC policy rule is a control command to allow the remote server to get the eUICC policy rule established in the current eUICC. The control command may be a discriminator indicating that the EventType gets the eUICC policy rule. The policy rule indicates a policy for the specific operation of the eUICC. An example of the policy rule may be as follows.

The installation of the specific profile may be limited.

The profile remote control of the specific server may be limited.

The installation of the profile of the specific provider may be limited.

The specific profile deletion may be limited.

The specific profile enable or disable may be limited.

The eUICC policy rule update may be used when the policy rules as listed above are added or removed.

The eUICC information reset is a remote control of removing some or all of the installed profiles.

Figure 10:
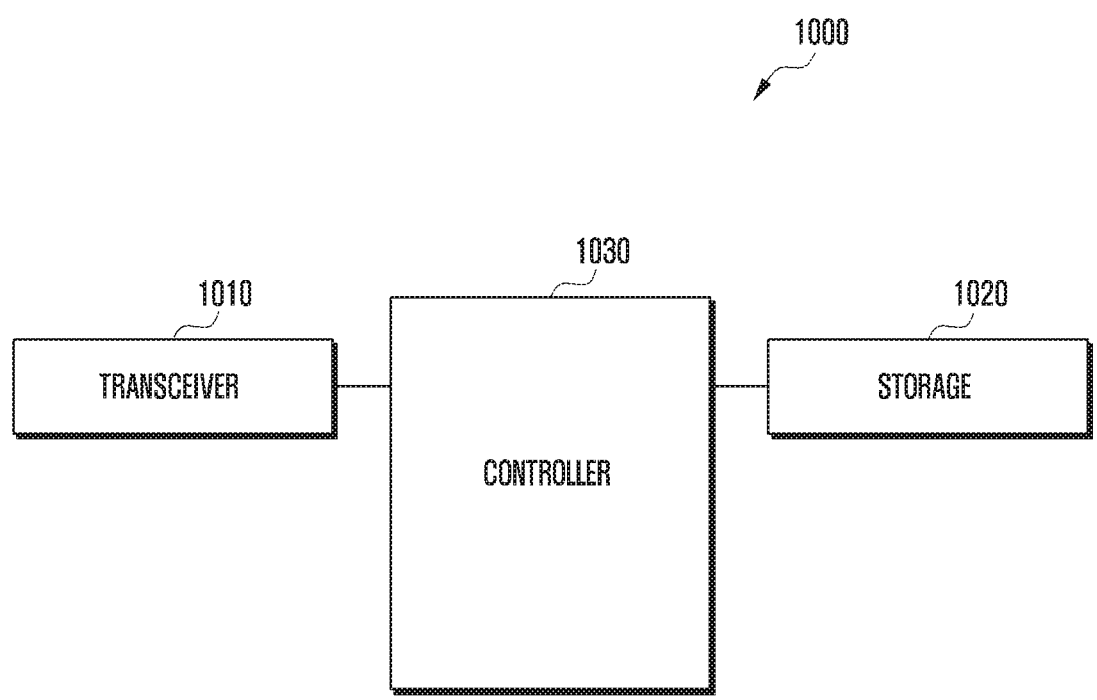
FIG. 10 is a block diagram illustrating a profile providing server according to an embodiment of the present disclosure.

FIG. 10 is a block diagram illustrating a profile providing server according to an embodiment of the present disclosure.

Referring to FIG. 10, a profile providing server 1000 may include a transceiver 1010 for receiving a signal from other nodes or transmitting a signal to other nodes, a controller 1030 for controlling an overall operation of the profile providing server, and a storage 1020 for storing a profile and profile related information.

According to the embodiment of the present disclosure, the controller 1030 may perform a control to receive a profile preparation request from a trigger system, transmit profile information to a profile information transfer server, based on the profile preparation request, receive a profile download request from an electric apparatus, and transmit a profile installable in a UICC of the electronic apparatus to the electronic apparatus. The profile information may be used to request the profile download of the electronic apparatus.

The profile information may include the information on the UICC of the electronic apparatus and the address information of the profile providing server providing the profile for the UICC.

The profile preparation request may include least one of a UICC discriminator, information on the profile information transfer server, a profile discriminator, a profile request type, a profile installation key, information on the electronic apparatus, and UICC information.

Further, the controller 1030 may perform a control to receive random information on the UICC from the electronic apparatus, transmit signature information corresponding to the random information and a certificate of the profile providing server to the electronic apparatus, receive encryption key generation data from the electronic apparatus if a verification for the signature information and the certificate succeeds, and transmit a profile encrypted with an encryption key generated based on the encryption key generation data to the electronic apparatus.

Further, according to the embodiment of the present disclosure, the controller 1030 may control an operation of transmitting profile information, an operation of downloading a profile, an authentication and verification procedure for downloading a profile, an operation of swapping a profile, an operation of changing information on the profile information transfer server, or the like.

Further, the operation of the profile providing server 1000 and the controller 1030 is not limited to the description of FIG. 10 and therefore, the operation and function of the profile providing server according to the embodiment of the present disclosure described with reference to FIGS. 1 to 9B may be performed.

According to the embodiment of the present disclosure, the profile providing server may include the profile management server or the profile control server or perform the functions thereof. The configuration of the profile providing server and the profile management server may correspond to the configuration of the profile providing server.

Figure 11:
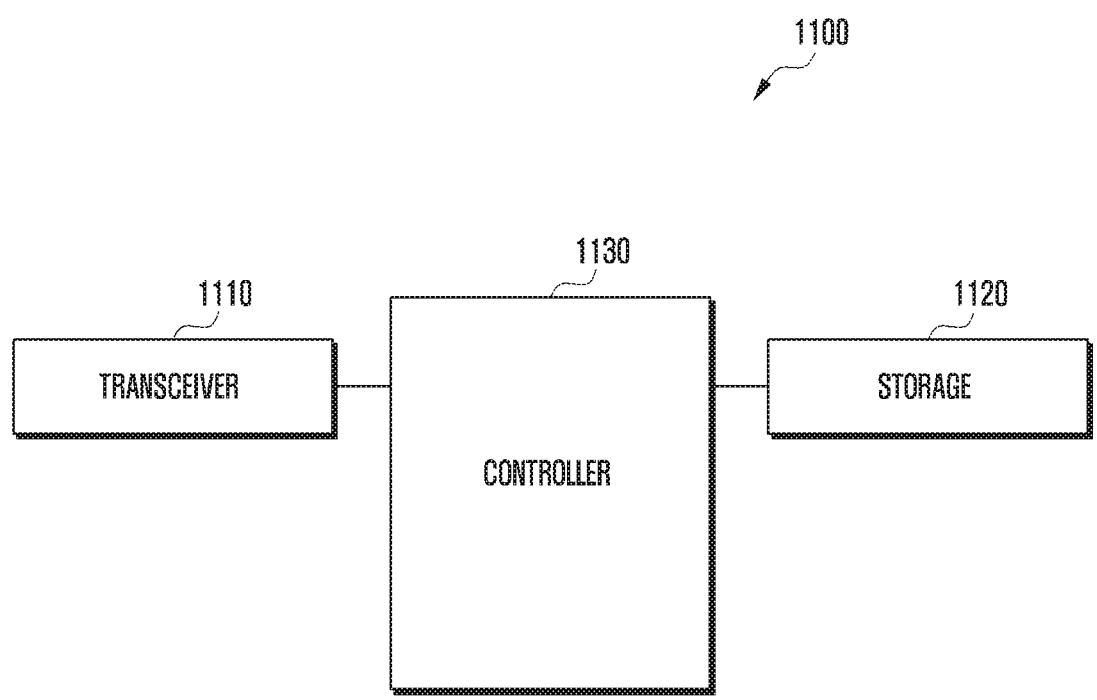
FIG. 11 is a block diagram illustrating a profile information transfer server according to an embodiment of the present disclosure.

FIG. 11 is a block diagram illustrating a profile information transfer server according to an embodiment of the present disclosure.

Referring to FIG. 11, a profile information transfer server 1100 may include a transceiver 1110 for receiving a signal from other nodes or transmitting a signal to other nodes, a controller 1130 for controlling an overall operation of the profile information transfer server 1100, and a storage 1120 for registering and storing profile information.

According to the embodiment of the present disclosure, the controller 1130 may perform a control to receive the profile information from the profile providing server, register the profile information, and transfer the profile information to the electronic apparatus corresponding to the profile information.

In this case, the profile information may be used to allow the electronic apparatus to download a profile installable in a UICC of the electronic apparatus from the profile providing server.

The profile information may include the information on the UICC of the electronic apparatus and the address information of the profile providing server providing the profile for the UICC.

Further, the controller 1130 may perform a control to perform one of an operation of transferring the profile information corresponding to a profile download request of the electronic apparatus and an operation of transferring the profile information using push notification, if identification information of the electronic apparatus is registered in the profile information transfer server in advance and then the profile information on the electronic apparatus is received by the profile information transfer server.

Further, according to the embodiment of the present disclosure, the controller 1130 may control a registration operation of transmitting profile information, a push operation, an operation of downloading a profile, an authentication and verification procedure for downloading a profile, an operation of swapping a profile, an operation of changing information on the profile information transfer server, or the like.

Further, the operation of the profile information transfer server 1100 and the controller 1130 is not limited to the description of FIG. 11 and therefore, the operation and function of the profile information transfer server according to the embodiment of the present disclosure described with reference to FIGS. 1 to 9B may be performed.

Figure 12:
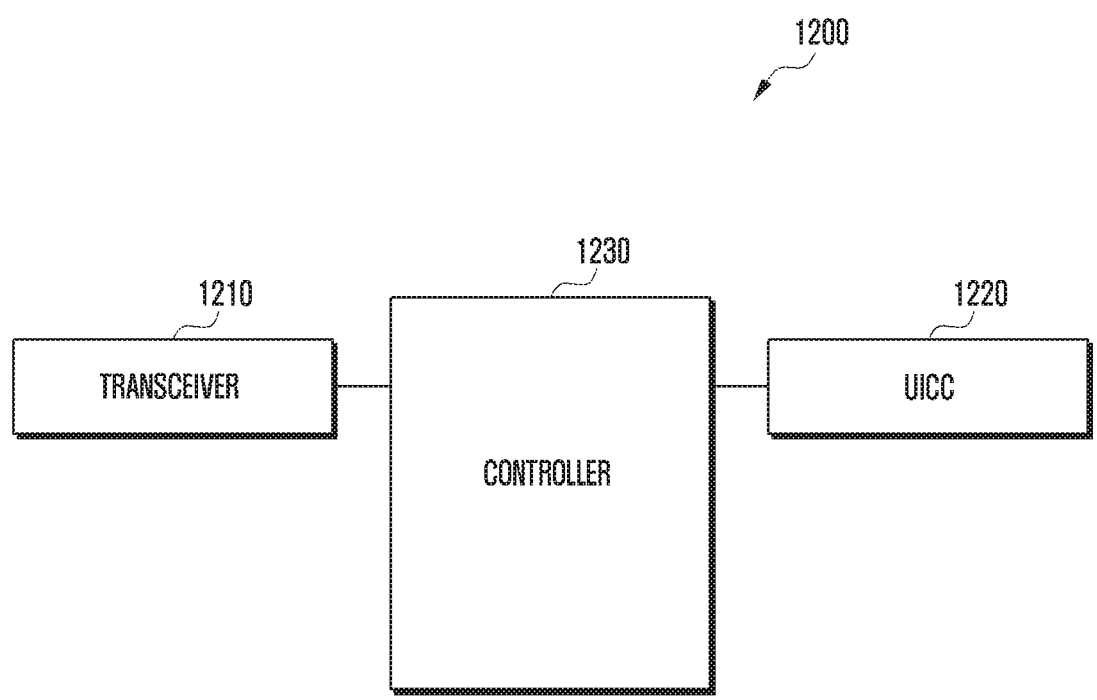
FIG. 12 is a block diagram illustrating an electronic apparatus according to an embodiment of the present disclosure.

FIG. 12 is a diagram illustrating an electronic apparatus according to an embodiment of the present disclosure.

Referring to FIG. 12, an electronic apparatus 1200 may include a transceiver 1210 for receiving a signal from other nodes and transmitting a signal to other nodes and a controller 1230 for controlling an overall operation of the electronic apparatus 1200. Further, the electronic apparatus 1200 may include a UICC 1220 for downloading the profile from the profile providing server and installing the downloaded profile. The UICC may be the eUICC. The controller 1230 may control an operation of the UICC 1220. The electronic apparatus 1220 may be the terminal. A UICC 1220 may include a processor or a controller for installing a profile or may have applications installed therein.

According to the embodiment of the present disclosure, the controller 1230 may perform a control to receive profile information from a profile information transfer server, transmit a profile request to an identified profile providing server based on the profile information, and receive a profile installable in the UICC of the electronic apparatus from the profile providing server.

In this case, the profile information may include the information on the UICC of the electronic apparatus and the address information of the profile providing server providing the profile for the UICC.

Further, the controller 1230 may perform a control to receive the profile information using one of an operation of receiving the profile information corresponding to a profile download request of the electronic apparatus and an operation of receiving the profile information using push notification, if identification information of the electronic apparatus is registered in the profile information transfer server in advance and then the profile information on the electronic apparatus is received by the profile information transfer server.

Further, the controller 1230 may perform a control to transmit random information on the UICC from the electronic apparatus to the profile providing server, receive signature information corresponding to the random information and a certificate of the profile providing server, verify the profile providing server based on the signature information and the signature, transfer encryption key generation data to the profile providing server, if the verification succeeds, and receive a profile encrypted with an encryption key generated based on the encryption key generation data.

Further, according to the embodiment of the present disclosure, the controller 1230 may control a registration and request operation of receiving profile information, an operation for downloading a profile, an authentication and verification procedure for downloading a profile, an operation of swapping a profile, an operation of changing information on the profile information transfer server, or the like.

The operation and function of the electronic apparatus 1200 is not limited to the description of FIG. 12. The electronic apparatus 1200 and the controller 1230 may control the operation of the electronic apparatus and the terminal (or eUICC of the terminal) according to the embodiment of the present disclosure described with reference to FIGS. 1 to 9B. Further, the processor of the UICC may control the operation of the eUICC or the UICC according to the embodiment of the present disclosure described with reference to FIGS. 1 to 12.

The controller 1230 may control the operation of the processor of the eUICC 1220 and may be implemented to perform the operation of the processor.

In the detailed embodiments of the present disclosure, components included in the present disclosure are represented by a singular number or a plural number according to the detailed embodiment as described above. However, the expressions of the singular number or the plural number are selected to meet the situations proposed for convenience of explanation and the present disclosure is not limited to the single component or the plural components and even though the components are represented in plural, the component may be configured in a singular number or even though the components are represented in a singular number, the component may be configured in plural.

According to the embodiments of the present disclosure, it is possible to provide the apparatus and method for downloading and installing a profile in a communication for a communication connection. Further, it is possible to provide the apparatus for transmitting a profile to enable the foregoing apparatus to download the profile and the apparatus for transmitting profile information and the operation method thereof.

According to the embodiments of the present disclosure, it is possible to automatically install the profile using the communication service in the mobile communication terminal in the wireless communication system.

The methods according to various embodiments may be realized in a program command (or instruction) format that may be executed by using diverse computing means, so as to be recorded in a non-transitory, computer-readable medium. Herein, the computer-readable medium may independently include a program command (or instruction), data file, data structure, and so on, or may include a combination of the same. For example, the computer-readable medium may be stored in a volatile or nonvolatile storage device such as a ROM, a memory such as a RAM, a memory chip, or an integrated circuit, or a storage medium that may be optically or magnetically recorded and read by a machine (e.g., a computer) such as a compact disk (CD), a MD, a magnetic disk, or a magnetic tape, regardless of deletion possibility or re-recording; possibility. It will be understood by one of ordinary skill in the art that a memory that may be included in a mobile terminal is a storage medium that may be read by a machine for storing programs or a program including instructions according to various embodiments. The program command recorded on the computer-readable medium may be specially designed and constructed for the present disclosure or may be known to and usable by one of ordinary skill in a field of computer software.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A method performed by a first server in a communication system, the method comprising:
transmitting, to a second server, a first message including first information on an identifier for an embedded universal integrated circuit card (eUICC) of an electronic apparatus, second information on an address for the first server, and third information on an identifier for an event;
receiving, from the second server, a second message as a response to the first message;

receiving, from the electronic apparatus, the third information on the identifier for the event; and transmitting, to the electronic apparatus, a profile associated with the third information on the identifier for the event, based on the third information on the identifier for the event being authenticated.

2. The method of claim 1,
wherein the second information for the address of the first server is transmitted from the second server to the electronic apparatus, and
wherein the third information on the identifier for the event is received from the electronic apparatus based on the second information for the address of the first server.

3. The method of claim 1, further comprising:
receiving, from an entity of an operator, at least one of the first information for the identifier of the eUICC, fourth information for an address of the second server, and fifth information for a matching ID, before transmitting the first message.

4. The method of claim 1, further comprising:
transmitting, to the second server, a third message to delete an event registered at the second server; and
receiving, from the second server, a fourth message as a response to the third message.

5. The method of claim 1, wherein the first server is a subscription manager data preparation plus (SM-DP+), and the second server is a subscription manager discovery service (SM-DS).

6. The method of claim 1, wherein the profile is installed in the eUICC of the electronic apparatus.

7. The method of claim 1, wherein the profile comprises at least one of an application, a file system, or an authentication key value stored in the eUICC.

8. A first server in a communication system, the first server comprising:
a transceiver; and
a processor configured to:
transmit, via the transceiver to a second server, a first message including first information for an identifier of an embedded universal integrated circuit card (eUICC) of an electronic apparatus, second information for an address of the first server, and third information on an identifier for an event,
receive, via the transceiver from the second server, a second message as a response to the first message,
receive, via the transceiver from the electronic apparatus, the third information on the identifier for the event, and
transmit, via the transceiver to the electronic apparatus, a profile associated with the third information on the identifier for the event, based on the third information on the identifier for the event being authenticated.

9. The first server of claim 8,
wherein the second information for the address of the first server is transmitted from the second server to the electronic apparatus, and
wherein the third information on the identifier for the event is received from the electronic apparatus based on the second information for the address of the first server.

10. The first server of claim 8, wherein the controller is further configured to receive, via the transceiver from an entity of an operator, at least one of the first information for the identifier of the eUICC, fourth information for an address of the second server, and fifth information for a matching ID, before transmitting the message.

11. The first server of claim 8, wherein the controller is further configured to:
transmit, via the transceiver to the second server, a third message to delete an event registered at the second server, and
receive, via the transceiver from the second server, a fourth message in as a response to the third message.

12. The first server of claim 8, wherein the first server is a subscription manager data preparation plus (SM-DP+), and the second server is a subscription manager discovery service (SM-DS).

13. The first server of claim 8, wherein the profile is installed in the eUICC of the electronic apparatus.

* * * * *